United States Patent
Nguyen et al.

(10) Patent No.: US 11,231,515 B2
(45) Date of Patent: Jan. 25, 2022

(54) MULTI-Z HORIZON INTERPRETATION AND VISUALIZATION FROM SEISMIC DATA

(71) Applicant: Landmark Graphics Corporation, Houston, TX (US)

(72) Inventors: Nam Xuan Nguyen, Katy, TX (US); Xuewei Tan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 363 days.

(21) Appl. No.: 16/344,346

(22) PCT Filed: Nov. 6, 2017

(86) PCT No.: PCT/US2017/060193
§ 371 (c)(1),
(2) Date: Apr. 23, 2019

(87) PCT Pub. No.: WO2018/093597
PCT Pub. Date: May 24, 2018

(65) Prior Publication Data
US 2020/0049846 A1 Feb. 13, 2020

Related U.S. Application Data

(60) Provisional application No. 62/423,672, filed on Nov. 17, 2016.

(51) Int. Cl.
*G01V 1/30* (2006.01)
*G01V 1/34* (2006.01)

(52) U.S. Cl.
CPC ............... *G01V 1/301* (2013.01); *G01V 1/34* (2013.01); *G01V 2210/643* (2013.01); *G01V 2210/74* (2013.01)

(58) Field of Classification Search
CPC .. G01V 1/302; G01V 1/345; G01V 2210/642; G01V 99/005; G01V 1/301;
(Continued)

(56) References Cited

U.S. PATENT DOCUMENTS 5,229,976 A * 7/1993 Boyd ..................... G01V 1/301
367/73
7,283,911 B2 * 10/2007 Fitzsimmons ........... G01V 1/30
702/14
(Continued)

FOREIGN PATENT DOCUMENTS

WO WO-2013070383 A1 5/2013

OTHER PUBLICATIONS

Korean Intellectual Property Office, International Search Report and Written Opinion, PCT/US2017/060193, dated Jan. 23, 2018, 10 pages, Korea.
(Continued)

*Primary Examiner* — Kyle R Quigley
(74) *Attorney, Agent, or Firm* — Haynes and Boone, LLP

(57) ABSTRACT

Systems and methods for interpreting multi-Z horizons from seismic data are disclosed. Seismic data is displayed via a graphical user interface (GUI) of an application executable at a user's computing device. User input is received via the GUI for picking surfaces of a multi-Z horizon within a current view of the displayed data. The user's input is tracked as it is received via the GUI over a series of input points within the current view of the displayed seismic data. Based on the tracking, each of a plurality of surfaces for the multi-Z horizon and at least one edge point between the picked surfaces within the current view of the seismic data are determined. The current view of the seismic data within the GUI is dynamically updated to include a visual indica-
(Continued)

tion of the plurality of surfaces and the at least one edge point for the multi-Z horizon.

17 Claims, 15 Drawing Sheets

(58) Field of Classification Search
CPC . G01V 1/34; G01V 2210/643; G01V 2210/74
See application file for complete search history.

(56) References Cited

U.S. PATENT DOCUMENTS

| | | |
|---|---|---|
| 9,142,059 B1 | 9/2015 | Mallet et al. |
| 9,846,964 B2 | 12/2017 | Nguyen et al. |
| 2006/0089806 A1 | 4/2006 | Fitzsimmons et al. |
| 2008/0137479 A1 | 6/2008 | Syljuasen et al. |
| 2014/0140580 A1 | 5/2014 | Neave |
| 2014/0345857 A1 | 11/2014 | Imhof |
| 2016/0209530 A1 | 7/2016 | Nguyen et al. |
| 2018/0217282 A1* | 8/2018 | Keskes .................. G01V 1/345 |

OTHER PUBLICATIONS

Canadian Intellectual Property Office, Examiner's Report Application No. 3.036,900, dated May 18, 2021, 6 pages, Canada.

* cited by examiner

MULTI-Z HORIZON INTERPRETATION AND VISUALIZATION FROM SEISMIC DATA

CROSS-REFERENCE TO RELATED APPLICATIONS

This application is a U.S. national stage patent application of International Patent Application No. PCT/US2017/060193, filed on Nov. 6, 2017, which claims priority to U.S. Provisional Application No. 62/423,672, filed on Nov. 17, 2016, the benefit of both of which are claimed and the disclosures of both of which are incorporated herein by reference in their entireties.

TECHNICAL FIELD

The present description relates generally to seismic data interpretation, and more particularly, to the interpretation of multiple Z-valued horizons from seismic data for geological structure modeling.

BACKGROUND

For purposes of hydrocarbon exploration and production, knowing the properties and locations of underground rock formations is useful for making decisions as to where and how to economically produce hydrocarbons from underground reservoirs. Seismic reflection surveys of both onshore and offshore hydrocarbon bearing formations are often performed to collect seismic data that may be used to gain an understanding of the particular geological structure of each formation. For example, such data may be used to identify geological features, such as horizons and faults, within a volume of a subsurface formation. Seismic reflection is a technique of generating seismic waves and measuring the time taken for the seismic waves to travel from the source of the waves, reflect off subsurface geological features, and be detected by an array of receivers at the surface. Each receiver's response to a single shot of seismic energy is known as a trace and is recorded for analysis. In land acquisition, seismic waves are transmitted from the surface, produced either mechanically or by explosive device. Resulting reflections from the subsurface are received at geophone sensors. In marine data acquisition surveying geological structures underlying a body of water, a water-going vessel is utilized to tow acoustic sources and seismic streamers supporting an array of hydrophones to detect reflected seismic waves.

Interpretation of seismic reflection surveys often involves analyzing multiple volumes of seismic data to identify geological structures and stratigraphic features of the subsurface formation. To facilitate such seismic data analysis, seismic interpretation tools are available for a geophysicist to "pick" horizons and other stratigraphic features within a volume of a seismic data. However, the interpretation of subsurface geological structures that have relatively complex geometries within a seismic volume can become a tedious and time-consuming process for geophysicists using conventional seismic interpretation tools. Examples of such complex geological structures include, but are not limited to, reverse faults, overturned beds, salt bodies, and any other structure for which different portions of the structure intersect the same seismic trace multiple times. Such a complex structure may be referred to as having multiple Z (or "multi-Z") points at the same X and Y location within a three-dimensional (3D) X, Y and Z coordinate space of a 3D seismic volume, where Z is the depth axis through the seismic volume. Each intersection point along the Z-axis may be associated with a different surface of the same multiple Z-valued horizon to represent the complex structure. The interpretation of such a multi-Z horizon using conventional tools generally requires multiple, overlapping horizons or horizon segments to be manually selected or "picked" from the seismic data and then, patched together so as to represent what is actually a single geological structure or event. Furthermore, any changes to the conventional interpretation may require manual updates to each of its constituent segments.

BRIEF DESCRIPTION OF THE DRAWINGS

The present disclosure is best understood from the following detailed description when read with the accompanying figures.

DETAILED DESCRIPTION

Figure 1:
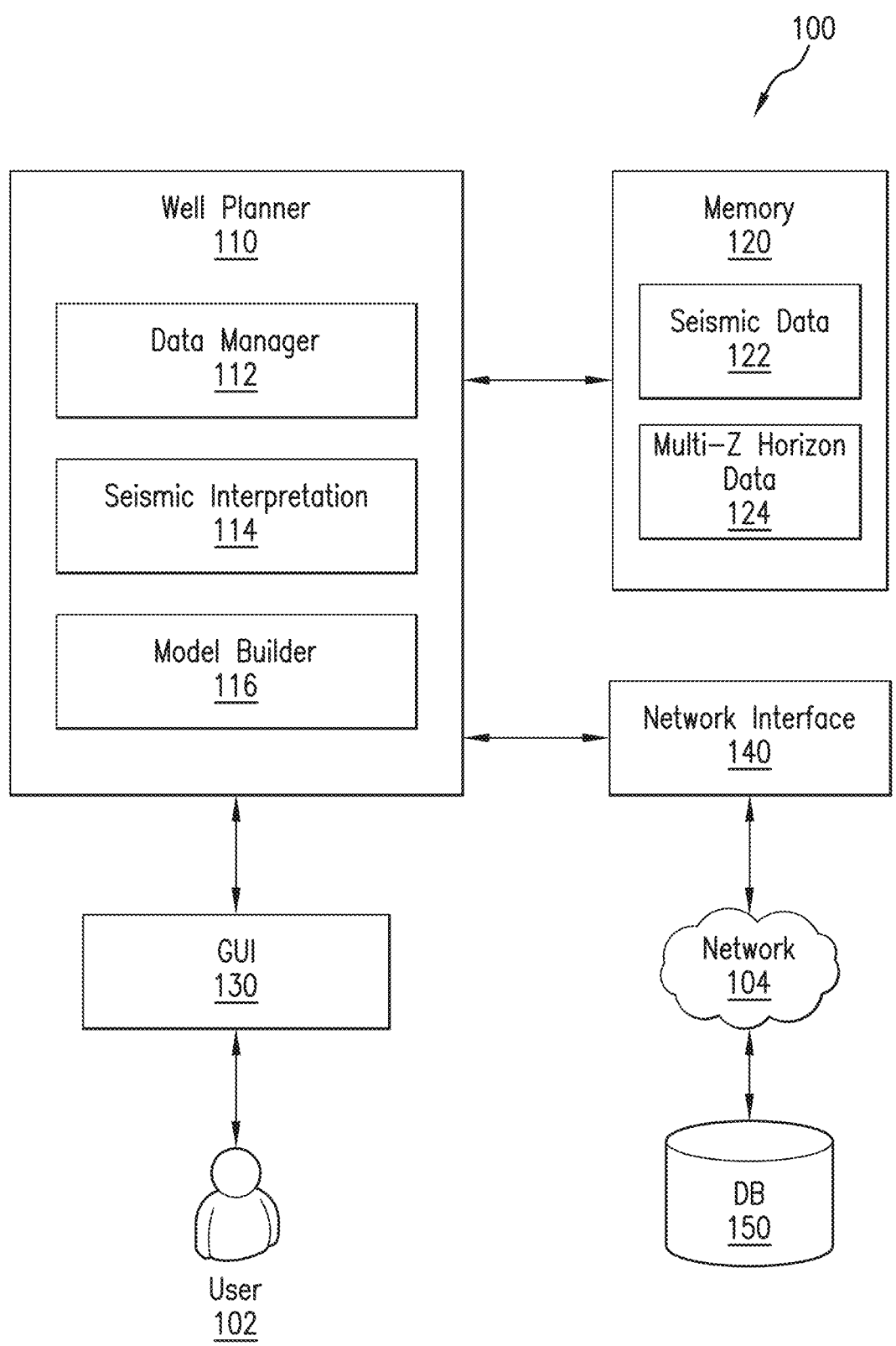
FIG. 1 is a block diagram of an illustrative system for well planning and data analysis.

Embodiments of the present disclosure relate to interpreting and visualizing multi-Z horizons representing complex geological structures within a subsurface formation. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one or more embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Embodiments of the present disclosure may be used to facilitate the interpretation of multi-Z horizons from seismic data for improved modeling and analysis of subsurface reservoir formations. Such a multi-Z horizon may represent a layer of the subsurface formation in which a complex geological structure, e.g., a reverse fault, overturned beds or a salt body, is located. The seismic data for the multi-Z horizon may include, for example, three-dimensional (3D) seismic volume datasets derived from a 3D seismic survey of the subsurface formation (or portion thereof) and/or two-dimensional (2D) datasets along 2D seismic sections. For example, the seismic survey may have been performed for an area of the formation that has been targeted for hydrocarbon exploration and production.

In one or more embodiments, the seismic data may be displayed for a user, e.g., a geophysicist, via a graphical user interface (GUI) of a seismic interpretation application executable at the user's computing device. For example, a 2D or 3D representation (e.g., 2D section or 3D cube view) of the seismic data may be displayed within a content viewing area or window of the GUI. The user may use a user input device (e.g., a touch-screen, microphone, keyboard, mouse or other type of pointing device) coupled to the user's computing device to interact directly with the displayed representation of the data for interpreting different surfaces of a multi-Z horizon of interest from the seismic data. In one or more embodiments, the displayed representation may be dynamically updated to include a visualization of the multi-Z horizon as it is being interpreted by the user, e.g., according to the user's interactions via the GUI.

As will be described in further detail below, the interaction by the user may involve picking surfaces of the multi-Z horizon at different Z values or points along the Z-axis of a 3D XYZ coordinate space. The picked surfaces may be, for example, a pair of consecutive Z-valued surfaces (also referred to herein as "Z surfaces" or "multi-Z surfaces") corresponding to different surfaces of the multi-Z horizon at various points along the Z-axis. Conventional techniques for picking such Z surfaces generally require the user to specify each of the Z surfaces individually and then repeatedly switch between the individual surfaces to make any necessary adjustments for appropriately interpreting the multi-Z horizon. By contrast, the disclosed multi-Z horizon interpretation techniques allow the user to perform a continuous picking action for interpreting consecutive Z surfaces of the multi-Z horizon from the displayed seismic data without having to specify and adjust each of the surfaces individually. The disclosed techniques may also be used to provide a variety of automated real-time visualization and data validation features to improve both the user's experience in picking relevant Z surfaces for the multi-Z horizon to be interpreted as well as the accuracy of the resulting interpretation. In this way, the disclosed techniques may be used to provide a more efficient seismic interpretation workflow, which reduces the amount of user input needed to pick multi-Z surfaces from the seismic data and thereby, also reduces the potential for user error in performing the interpretation. While the examples provided below may be described in the context of multi-Z horizons having two surfaces, e.g., a top surface and a bottom or base surface, it should be appreciated that the embodiments of the present disclosure are not intended to be limited thereto and that the disclosed multi-Z interpretation and visualization techniques may be applied to multi-Z horizons having any number of surfaces.

Illustrative embodiments and related methodologies of the present disclosure are described below in reference to FIGS. 1-14 as they might be employed, for example, in a computer system for data analysis and well planning. Such a computer system may be used to plan and implement downhole operations along a wellbore within a subsurface formation. Such operations may include, for example and without limitation, drilling, production, and stimulation operations. In some implementations, the computer system may be part of an overall well system for performing downhole operations for hydrocarbon exploration and/or production to be performed along a wellbore drilled within a subsurface formation. An example of such a well system will be described below in reference to FIG. 15. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

In the examples described below, data from seismic surveying along with other available geophysical, borehole, and geological data may be used to provide information about the structure and distribution of rock types and properties of different layers of a subsurface formation. While the following examples may be described in the context of land-based seismic surveying, it should be noted that the techniques disclosed herein are not intended to be limited thereto and that these techniques may be applied to seismic surveys performed on land or in water, e.g., as part of an on-shore or off-shore drilling operation, respectively. Also, while a figure may depict a horizontal wellbore or a vertical wellbore, it should be understood by those skilled in the art that embodiments of the present disclosure are not intended to be limited thereto and that the techniques disclosed herein may be applied to wellbores having other orientations, including deviated or slanted wellbores and multilateral wellbores or the like. Further, unless otherwise noted, even though a figure may depict a cased hole, it should be understood by those skilled in the art that the disclosed apparatus and techniques are equally well suited for use in open-hole operations.

FIG. 1 is a block diagram of an illustrative system 100 for well planning and data analysis. As shown in FIG. 1, system 100 includes a well planner 110, a memory 120, a graphical user interface (GUI) 130, and a network interface 140. In one or more embodiments, well planner 110, memory 120, GUI 130, and network interface 140 may be communicatively coupled to one another via an internal bus of system 100. Although only well planner 110, memory 120, GUI 130, and network interface 140 are shown in FIG. 1, it should be appreciated that system 100 may include additional components, modules, and/or sub-components as desired for a particular implementation.

System 100 can be implemented using any type of computing device having at least one processor and a processor-readable storage medium for storing data and instructions executable by is the processor. Examples of such a computing device include, but are not limited to, a mobile phone, a personal digital assistant (PDA), a tablet computer, a laptop computer, a desktop computer, a workstation, a server, a cluster of computers, a set-top box, or other type of computing device. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by the computing device to output or present information via an output device (not shown). The output device may be, for example, a display coupled to or integrated with the computing device for displaying a digital representation of the information being presented to the user. The I/O interface in the example shown in FIG. 1 may be coupled to GUI 130 for receiving input from a user 102 and displaying information and content to user 102 based on the received input. GUI 130 can be any type of GUI display coupled to system 100.

As will be described in further detail below, memory 120 can be used to store information accessible by well planner 110 and any of its components for implementing the functionality of the present disclosure. Memory 120 may be any type of recording medium coupled to an integrated circuit that controls access to the recording medium. The recording medium can be, for example and without limitation, a semiconductor memory, a hard disk, or similar type of memory or storage device. In some implementations, memory 120 may be a remote data store, e.g., a cloud-based storage location, communicatively coupled to system 100 over a network 104 via network interface 140. Network 104 can be any type of network or combination of networks used to communicate information between different computing devices. Network 104 can include, but is not limited to, a wired (e.g., Ethernet) or a wireless (e.g., Wi-Fi or mobile telecommunications) network. In addition, network 104 can include, but is not limited to, a local area network, medium area network, and/or wide area network such as the Internet.

In one or more embodiments, well planner 110 includes a data manager 112, a seismic interpretation unit 114, and a model builder 116. Data manager 112 may be used to retrieve seismic data from a surface seismic survey of the subsurface formation, e.g., using surface and/or downhole seismic sensors, as described above. The seismic data may be retrieved by data manager 112 from a remote data store or database 150 via network interface 140 and network 104. The retrieved seismic data may be stored within memory 120 as seismic data 122. The retrieved seismic data may include, for example, surface seismic depth images that can be used to pick multi-Z horizon layer surfaces representing the boundaries of complex geological structures, as will be described in further detail below. In one or more embodiments, each surface may be represented as a surface grid corresponding to a seismic section or volume or portion thereof.

In one or more embodiments, seismic interpretation unit 114 may display different views of seismic data 122 within a content viewing area or visualization window of GUI 130. For example, a 2D or 3D representation (e.g., 2D section or 3D cube view) of seismic data 122 may be displayed within the visualization window of GUI 130. GUI 130 and the information displayed therein may be presented to a user 102 via a display device (not shown) coupled to system 100. The display device may be, for example and without limitation, a cathode ray tube (CRT) monitor, a liquid crystal display (LCD), or a touch-screen display, e.g., in the form of a capacitive touch-screen light emitting diode (LED) display.

User 102 may use a user input device (e.g., a touch-screen, microphone, keyboard, mouse or other type of pointing device) coupled to system 100 to interact directly with the displayed representation of seismic data 122 for interpreting different surfaces of a multi-Z horizon of interest. In one or more embodiments, seismic interpretation unit 114 may dynamically update the displayed representation to include a visualization of the multi-Z horizon as it is being interpreted by user 102, e.g., according to the user's interactions via GUI 130. As will be described in further detail below, the interpretation by user 102 may involve picking surfaces of a multi-Z horizon at different Z values or points corresponding to pick locations along the "Z" or depth axis of a 3D XYZ coordinate space. The picked surfaces may be, for example, a pair of consecutive or continuous Z-valued surfaces of the multi-Z horizon. In one or more embodiments, an intersection point at the edge between at least two of the surfaces may be automatically identified and displayed for the multi-Z horizon. Also, as will be described in further detail below, the location of such an edge point may be adjusted by the user as desired via GUI 130. An example of an interactive GUI that may be used to implement GUI 130 is shown in FIG. 2.

Figure 2:
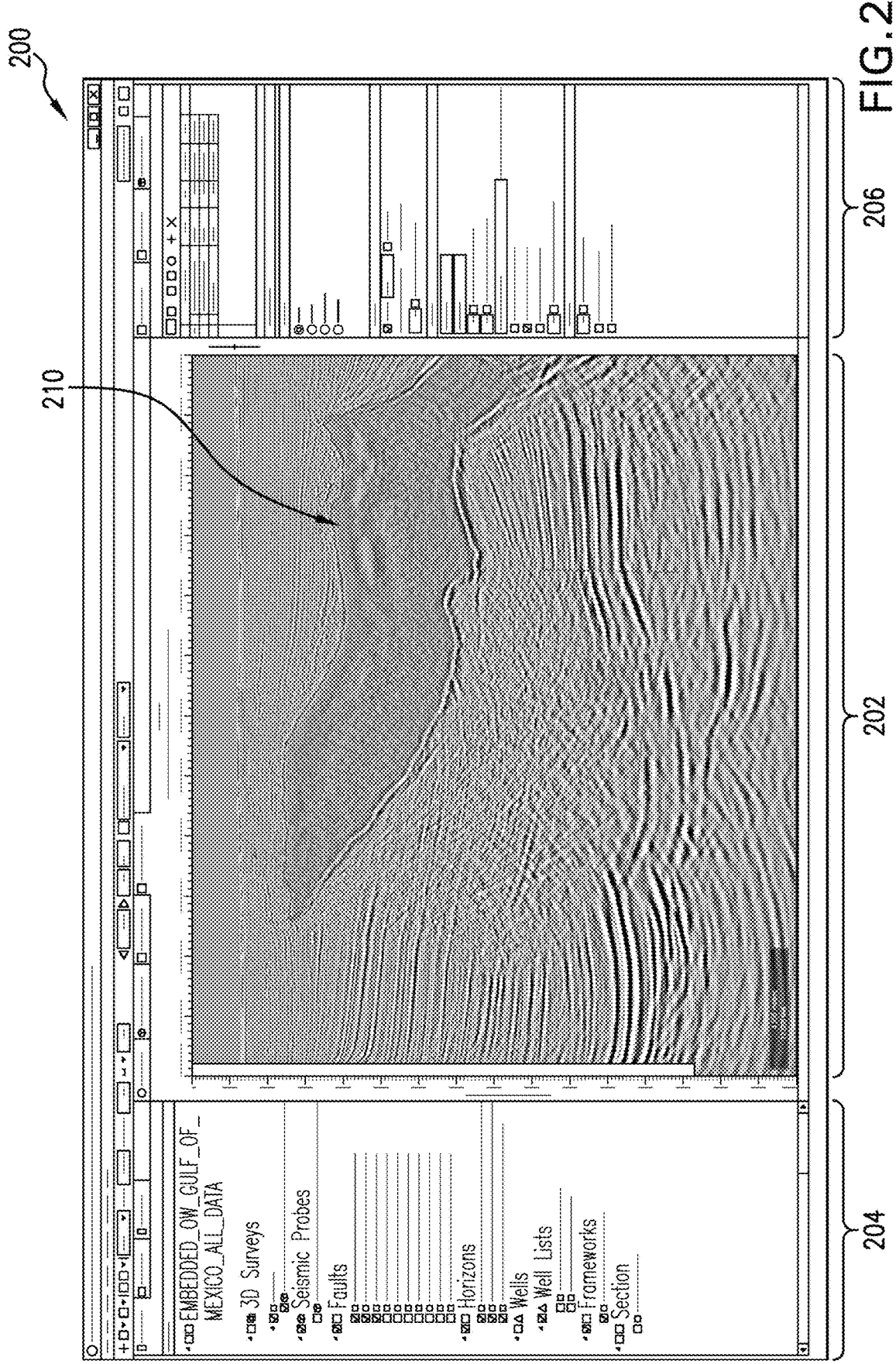
FIG. 2 is a view of an illustrative graphical user interface (GUI) for interpreting and visualizing multi-Z horizons within a seismic volume.

FIG. 2 is a view of an illustrative GUI 200 for interpreting and visualizing multi-Z horizon surfaces representing the boundaries of a complex geological structure (e.g., a salt body) within a seismic volume associated with a subsurface formation. The seismic volume may correspond to, for example, an area of the formation that has been targeted for hydrocarbon exploration and production. In one or more embodiments, seismic data for the seismic volume may be obtained from a 3D seismic survey of the targeted formation area. The seismic data may include seismic traces corresponding to one or more vertical sections of the seismic survey area.

As shown in FIG. 2, GUI 200 includes a visualization window 202 for displaying different views of the seismic data. For example, as shown in FIG. 2, a current view of the seismic data within visualization window 202 may include a 2D representation of a vertical seismic section. Such a 2D seismic section may be displayed within visualization window 202 as a plurality of seismic traces corresponding to the vertical seismic section. In one or more embodiments, the seismic data displayed within visualization window 202 may be based on particular seismic datasets selected by the user via a data selection window 204 of GUI 200. Such datasets may be associated with different geological features, e.g., faults, of the formation as well as different seismic data sources (e.g., one or more wells and/or seismic probes). The user may also specify various parameters and user options via a user options window 206 of GUI 200. Examples of such user options may include, but are not limited to, options for performing various actions relating to interpreting and/or modifying previously picked surfaces of a multi-Z horizon as well as options for setting picking tolerances for different surfaces of a multi-Z horizon to be interpreted.

In one or more embodiments, visualization window 202 may also be used to receive input from a user (e.g., user 102 of FIG. 1) for interpreting a multi-Z horizon 210 within the displayed 2D seismic section. The user in this example may pick different surfaces of multi-Z horizon 210 by using a user input device (e.g., mouse or touch-screen display) to interact directly with the displayed 2D seismic section of the subsurface formation. The user interaction may involve specifying the boundaries of multi-Z horizon 210 by drawing or marking segments of the surfaces of multi-Z horizon 210 within the seismic section as displayed within visualization window 202. For example, the user may draw each segment by selecting the start and end points of the segment within visualization window 202, whereby the corresponding line segment may be automatically drawn or visualized between the two points within GUI 200. Alternatively, the user may use the user input device to manually draw the individual segments of each surface, e.g., by holding down a mouse button while moving the mouse pointer along a continuous path corresponding to the segment(s) being drawn.

As shown in FIG. 2 and as will be described in further detail below, the seismic section displayed within visualization window 202 may be dynamically updated to indicate each surface and the area between the surfaces as they are specified or "drawn" by the user, according to the user input detected (e.g., by seismic interpretation unit 114 of FIG. 1) with respect to the displayed seismic section within visualization window 202. In one or more embodiments, the user's input may be detected as a series of input points within visualization window 202. In one or more embodiments, each input point may correspond to a location along a seismic trace representing a portion of the vertical seismic section depicted within visualization window 202.

Figure 3B:
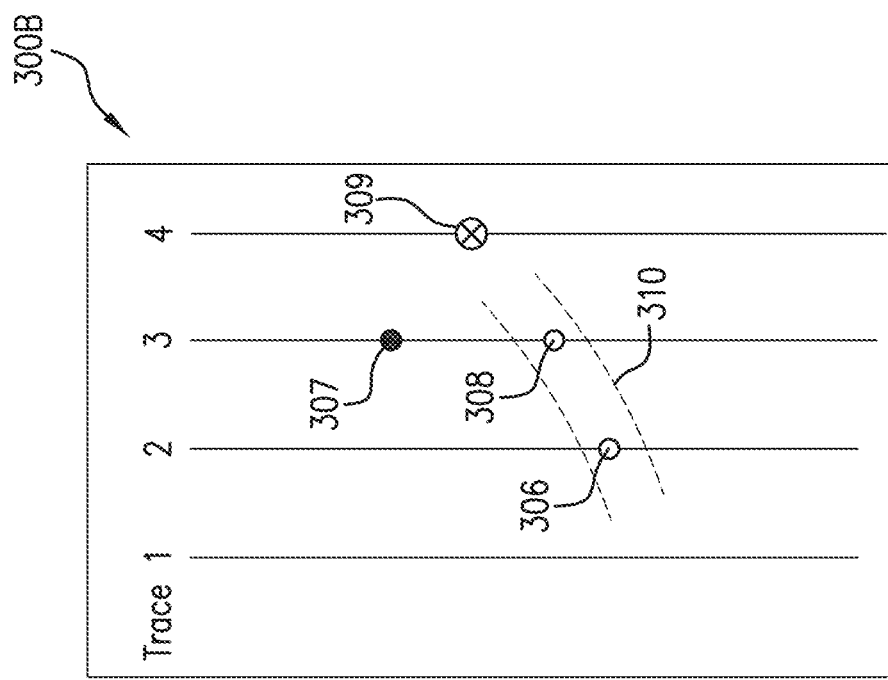
FIGS. 3A and 3B are diagrams of illustrative sets of seismic traces corresponding to different vertical sections of a seismic survey.
Figure 3A:
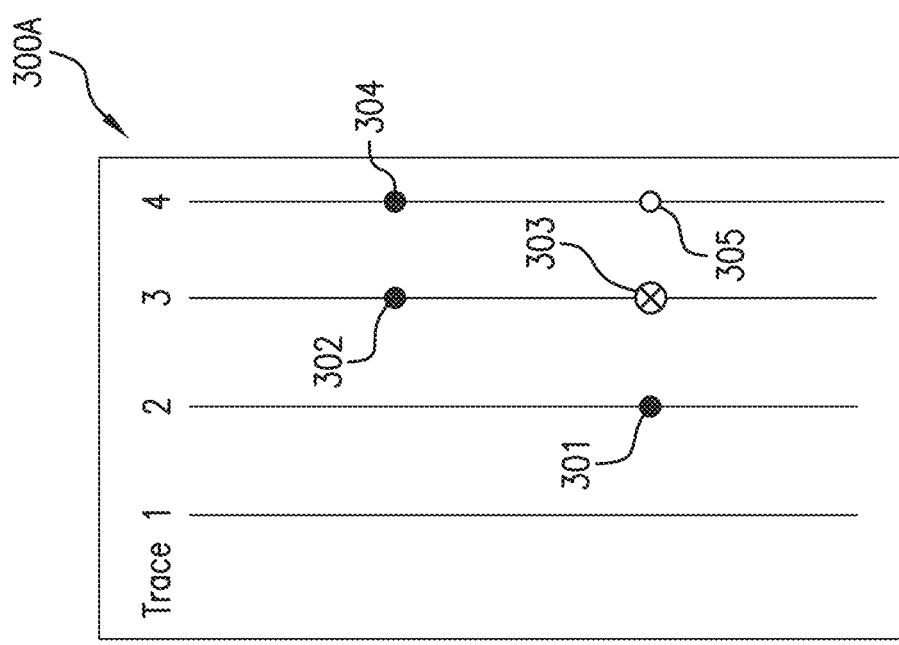

FIGS. 3A and 3B are diagrams of illustrative sets of seismic traces corresponding to different vertical seismic sections of a seismic survey. While only four traces are shown in FIGS. 3A and 3B for each seismic section, it should be appreciated that embodiments are not limited thereto and that each section may be represented by any number of seismic traces. Each seismic trace may run along the depth or Z axis of a 3D coordinate space and include one or more input points that correspond to a particular depth or Z-value along the Z-axis. A set of input points located at various depths along a seismic trace may correspond to different surfaces of a multi-Z horizon, e.g., as picked by the user via GUI 200 of FIG. 2, as described above. Accordingly, the locations of such input points may be referred to herein as "pick locations". Depending on the type of multi-Z horizon being interpreted, the input points for a given surface of the multi-Z horizon may be located at the same or different depth along Z-axis.

In FIG. 3A, for example, a seismic section 300A is represented by a set of four adjacent seismic traces, which include input points corresponding to the pick locations for different surfaces of a reverse fault. The first trace ("Trace 1") in FIG. 3A does not include any input points while the second trace includes one input point and the remaining traces each include two input points. Input points 301, 302 and 304 on Traces 2, 3 and 4, respectively, may correspond to a first surface of the reverse fault in this example. Input point 305 on Trace 4 may correspond to a second surface of the reverse fault. A point 303 on Trace 3 may be an edge point between the first and second surfaces. It may be assumed for purposes of this example that input points 302 and 304 are located at the same depth along the Z-axis and therefore, have the same Z value. Likewise, it may be assumed that input points 301 and 305 along with edge point 303 are located at the same depth and have the same Z value.

In one or more embodiments, the presence of an edge point (e.g., edge point 303) on a seismic trace (e.g., Trace 3) between the traces of two input points at the same depth (e.g., input points 301 and 305 on Traces 2 and 4, respectively) may provide an indication that these input points correspond to different faulted surfaces of a multi-Z horizon, such as a reverse fault. In one or more embodiments, the location of such an edge point may be automatically determined based on monitoring or tracking the user's input as it is received via a GUI of a seismic interpretation application, e.g. GUI 300 of FIG. 3, as described above.

In contrast with the input points for faulted multi-Z surfaces as shown in FIG. 3A, FIG. 3B is a diagram of a seismic section 300B including adjacent traces with input points for continuous or overturned surfaces of a multi-Z horizon, e.g., a salt body or overturned beds. In FIG. 3B, input points 306 and 308 on Traces 2 and 3, respectively, may correspond to the pick locations for a first surface of such a multi-Z horizon and input point 307 on Trace 3 may correspond to the pick location for a second surface of the multi-Z horizon. An edge point 309 between the first and second surfaces of the multi-Z horizon may be automatically placed at an appropriate location on Trace 4 based on the relative locations of input points 307 and 308.

In one or more embodiments, a pick or picking tolerance may be used to determine which input points across a set of adjacent seismic traces are pick locations for each surface of the multi-Z horizon. For example, the picking tolerance may represent a difference threshold between the depth or Z values of input points nearby an input point that is known or designated as a pick location for a particular surface of the multi-Z horizon. Any input points that are located within the picking tolerance of such a known or designated pick location for a particular surface of the multi-Z horizon may be identified as additional pick locations for that surface. In this way, the picking tolerance may define a tolerance window encompassing a range of Z values for identifying additional input points as pick locations around existing or prior pick locations for the surface, e.g., as shown by pick tolerance 310 around input points 306 and 308 for the bottom surface of the multi-Z horizon being interpreted in FIG. 3B.

Figure 4A:
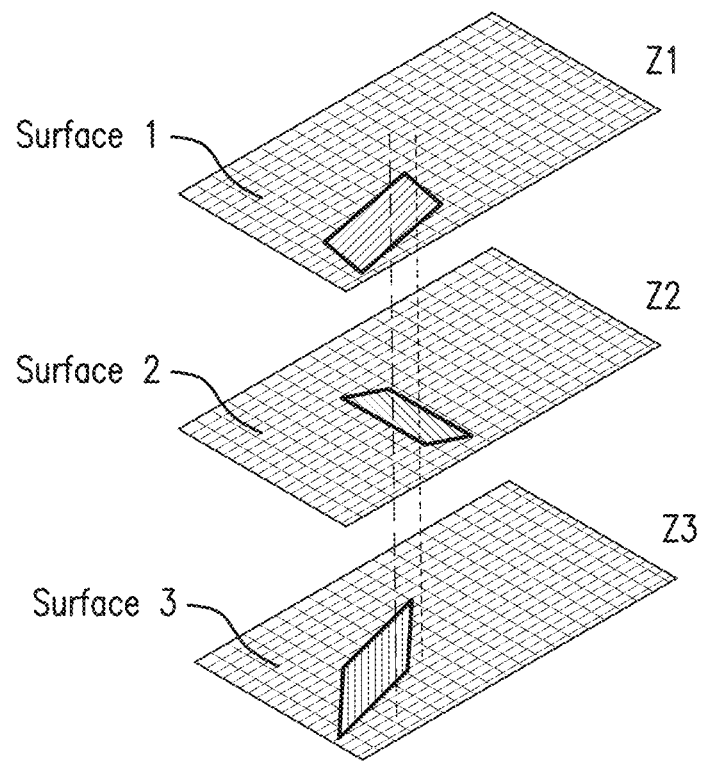
FIGS. 4A and 4B are diagrams of illustrative multi-Z surfaces that may be interpreted from the user-specified pick locations of one or more seismic traces.

FIG. 4A is a diagram of illustrative multi-Z surfaces that may be interpreted from user-specified pick locations at different depths along one or more seismic traces, similar to those shown in FIGS. 3A and 3B. In one or more embodiments, each surface that is picked by the user may be assigned a numerical identifier (or "ID") corresponding to a level or depth position of that surface relative to other surfaces of the multi-Z horizon. For example, as shown for the faulted surfaces in FIG. 4B, the surface at the top-most level or highest depth position (with smallest depth value) may be assigned an ID of "1" and the remaining surfaces at lower levels or depth positions (with larger depth values) may be assigned relatively increasing integer IDs (e.g., "2" for the second highest surface, "3" for the surface third highest surface, and so on). Accordingly, the surfaces of the multi-Z horizon may appear in ascending order according to their respective IDs, where the top-most surface having the smallest depth value is assigned the smallest or lowest ID number and the bottom-most or deepest surface having the largest depth value is assigned the largest or highest ID number. However, it should be appreciated that any numbering scheme may be for assigning IDs to surfaces and ordering the surfaces.

Figure 4B:
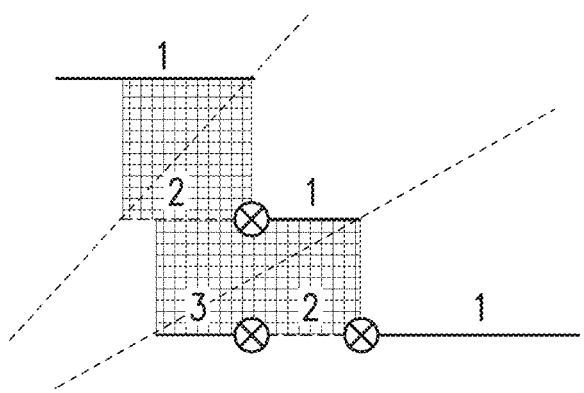

In one or more embodiments, a visual representation (e.g., a 2D representation) of the seismic data displayed within the GUI may be dynamically updated to include a plurality of visual indications for different surfaces of the multi-Z horizon, for example, the different faulted surfaces of a reserve fault, as illustrated in FIG. 4B. Such visual indications may include, for example and without limitation, different line patterns or styles for representing the different surfaces, e.g., a solid line for each surface having an odd-valued ID (e.g., 1 or 3) and a dashed line for each surface having an even ID (e.g., 2). The visual indications for the surfaces may further include a text label indicating each surface's numerical ID, which may be superimposed onto the surface or segment thereof as represented within the current view of the seismic data. Also, different types of highlighting (or color-fill), shading, textures or transparencies may be used to provide a visual indication of areas between different surfaces at locations where they co-exist (or have data points that co-exist) along the same seismic trace(s) within a seismic section. Furthermore, a separate visual indicator (e.g., a circle with an X) may be used to represent each intersection point ("edge point") between each pair of consecutive surfaces, e.g., as shown between surfaces 1 and 2 and also, between surfaces 2 and 3 in FIG. 4B. It should be appreciated that any type of visual indicator or marker of any shape or size may be used to represent such edge points. The above-described visual techniques may be used to present the various surfaces of a multi-Z horizon in way that allows complex relationships between different surfaces to be more easily understood and thereby, enables real-time validation of multi-Z surfaces to be performed while they are being interpreted from seismic data.

Figure 5A:
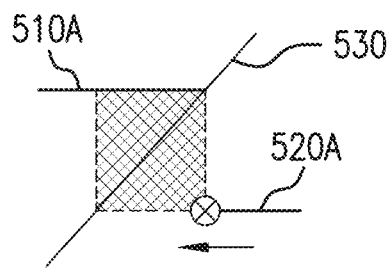
FIGS. 5A, 5B, 5C and 5D are diagrams of illustrative visualizations of multi-Z horizons for various complex geological structures or objects within a subsurface formation.
Figure 5B:
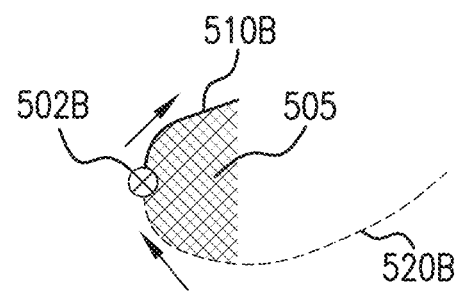
Figure 5C:
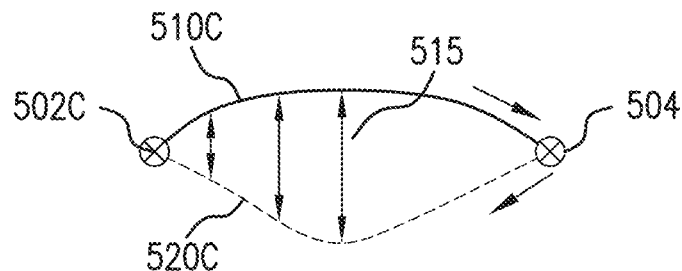
Figure 5D:
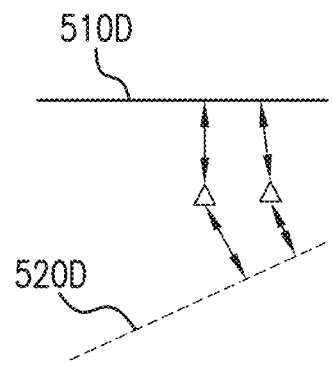

FIGS. 5A, 5B, 5C and 5D are diagrams of illustrative visualizations of multi-Z horizon surfaces for various complex geological structures or objects within a subsurface formation. In FIG. 5A, an example of a multi-Z horizon with faulted surfaces 510A and 520B on different sides of a reverse fault 530 is shown. In FIGS. 5B and 5C, examples of overturned or continuous multi-Z surfaces are shown. For both faulted and overturned multi-Z surfaces, input points located between any two surfaces may be assigned to the nearest of the two surfaces, as shown in FIG. 5D. In one or more embodiments, thickness variation and distinct line styles or patterns may be used to represent surfaces 510A, 510B, 510C and 510D as well as surfaces 520A, 520B, 520C and 520D of the multi-Z horizons shown in FIGS. 5A-5D, respectively. Also, highlights or shading 505 (as in FIG. 5B), arrows 515 (as in FIG. 5C), or other visual cues may be used to show the relationship between the surfaces so as to facilitate accurate validation of the interpretation results by a user via the above-described GUI.

In one or more embodiments, the edge points of a multi-Z horizon may be shown as circular shapes, as shown by edge point 502B in FIG. 5B and edge points 502C and 504 in FIG. 5C. Also, as shown in FIGS. 5B and 5C, such edge points may be connected by polylines corresponding to the different surfaces of the multi-Z horizon. However, it should be appreciated that any of various shapes or type of visual marker may be used to represent each edge point. Further, any of various visual enhancements may be applied to the portions of the multi-Z horizon for improved interpretation. Such enhancements may include, for example and without limitation: semi-transparent color-fill between two surfaces; display the multi-Z horizon as an overlay within a seismic section, where a first surface is shown as a solid line and a second surface below the first is shown as a dashed line; display of edge point as a circle where at least two surfaces intersect (e.g., where both first and second surfaces exist at the same depth or Z value); and display an indication of the relative thickness between two consecutive surfaces where both exist. While the multi-Z horizons as shown in the examples of FIGS. 5A-5D include only two surfaces provided below may be described in the context of multi-Z horizons having two surfaces, it should be appreciated that the embodiments of the present disclosure are not intended to be limited thereto and that the disclosed multi-Z interpretation and visualization techniques may be applied to multi-Z horizons having any number of surfaces.

Returning to system 100 of FIG. 1, information relating to the surfaces of a multi-Z horizon, e.g., as picked by user 102 via GUI 130, may be stored within memory 120 as multi-Z horizon data 124. In one or more embodiments, multi-Z horizon data 124 may include surface grid data corresponding to a surface grid representing each surface of the multi-Z horizon.

In one or more embodiments, model builder 116 may use multi-Z horizon data 124 and the results of the multi-Z interpretation to generate a 2D or 3D model of the subsurface formation. In some implementations, the formation model generated by model builder 116 may be based on a combination of multi-Z horizon data 124 and other information relating to the geological characteristics of the subsurface formation from one or more other data sources. Such information may include, for example, well log data obtained by a LWD or MWD downhole tool (e.g., downhole tool 1532 of FIG. 15, as will be described below) disposed within a wellbore drilled through the subsurface formation.

In one or more embodiments, the generated formation model may be used to perform any of various seismic analysis and well planning operations for the subsurface formation. An example of such an operation is seismic imaging of the subsurface layers. The generated seismic image may be presented to user 102 via another visualization window of GUI 130 and rendered on a display (not shown) coupled to system 100. Other examples of well planning operations that may be performed using the generated formation model include, but are not limited to, generating well placement or stimulation plans for drilling operations at one or more well sites, planning a well path or trajectory of a wellbore to be drilled through different layers of the formation, and adjusting or optimizing the planned path or trajectory of the wellbore as it is drilled through the formation. While not shown in FIG. 1, it should be appreciated that system 100 may include additional components or data processing units for performing such other seismic analysis and well planning operations in addition to the disclosed multi-Z seismic interpretation and visualization techniques. Additional details regarding these techniques will be described in further detail below with respect to FIGS. 6-13D.

Figure 6:
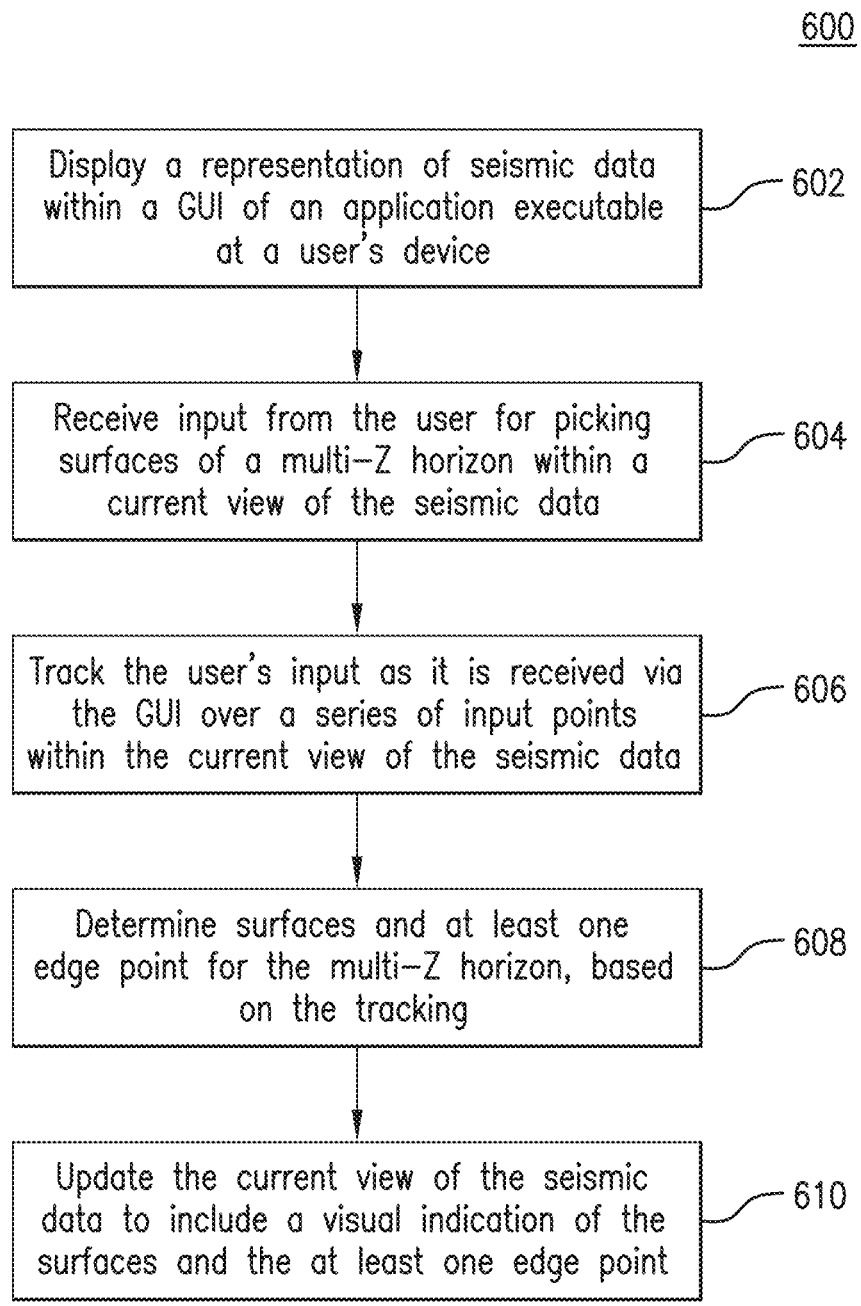
FIG. 6 is a flowchart of an illustrative process for interpreting different surfaces of a multi-Z horizon within a current view of seismic data as displayed within a GUI.

FIG. 6 is a flowchart of an illustrative process 600 for interpreting different surfaces of a multi-Z horizon. As shown in FIG. 6, process 600 begins in block 602, which includes displaying a representation of seismic data within a GUI, e.g., GUI 200 of FIG. 2, of a seismic interpretation application executable at a computing device or system of a user, e.g., user 102 of system 100 shown in FIG. 1, as described above. For example, a 2D or 3D representation of the seismic data may be displayed within a content viewing area or visualization window of the GUI.

In block 604, input from the user may be received via the GUI for picking a plurality of surfaces of a multi-Z horizon being interpreted within a current view of the displayed seismic data. The current view of the seismic data displayed within the GUI may correspond to, for example, a vertical seismic section from a 2D or 3D seismic survey of a subsurface formation. The user in this example may use a user input device (e.g., a touch-screen, microphone, keyboard, mouse or other type of pointing device) coupled to the user's computing device to interact directly with the displayed data for picking each surface of the multi-Z horizon.

In block 606, the user's input may be monitored or tracked as it is received over a series of input points within the current view of the seismic data. In one or more embodiments, the input points may correspond to pick locations for each of the surfaces of the multi-Z horizon. As described above, each surface of the multi-Z horizon may be located at a different Z-value or depth along the Z-axis of a 3D coordinate space.

Process 600 may then proceed to block 608, which includes determining each of the plurality of surfaces picked by the user for the multi-Z horizon and at least one edge point between the picked surfaces within the current view of the seismic data, based on the tracking in block 606. The determination in block 608 may depend on the type of geological structure or formation represented by the multi-Z horizon being interpreted. For example, the multi-Z horizon may represent a reverse fault with discontinuous or faulted surfaces and the edge point may be located at the same depth or Z value as the pick locations associated with one of the faulted surfaces. Alternatively, the surfaces of the multi-Z horizon may be continuous or overturned surfaces and an edge point may be located at each intersection between these surfaces. Such an intersection point may be located at a depth or Z value that is between the pick locations associated with the respective surfaces. Thus, a different process may be used to perform the determination in block 608, depending on the type of multi-Z horizon and multi-Z surfaces being picked by the user, as will be described in further detail below with respect to FIG. 7 for overturned surfaces and FIG. 8 for faulted surfaces. In one or more embodiments, the type of multi-Z horizon or surfaces may be specified by the user via, for example, a user control panel or options window provided within the GUI, e.g., user options window 206 of GUI 200 shown in FIG. 2, as described above.

Figure 7:
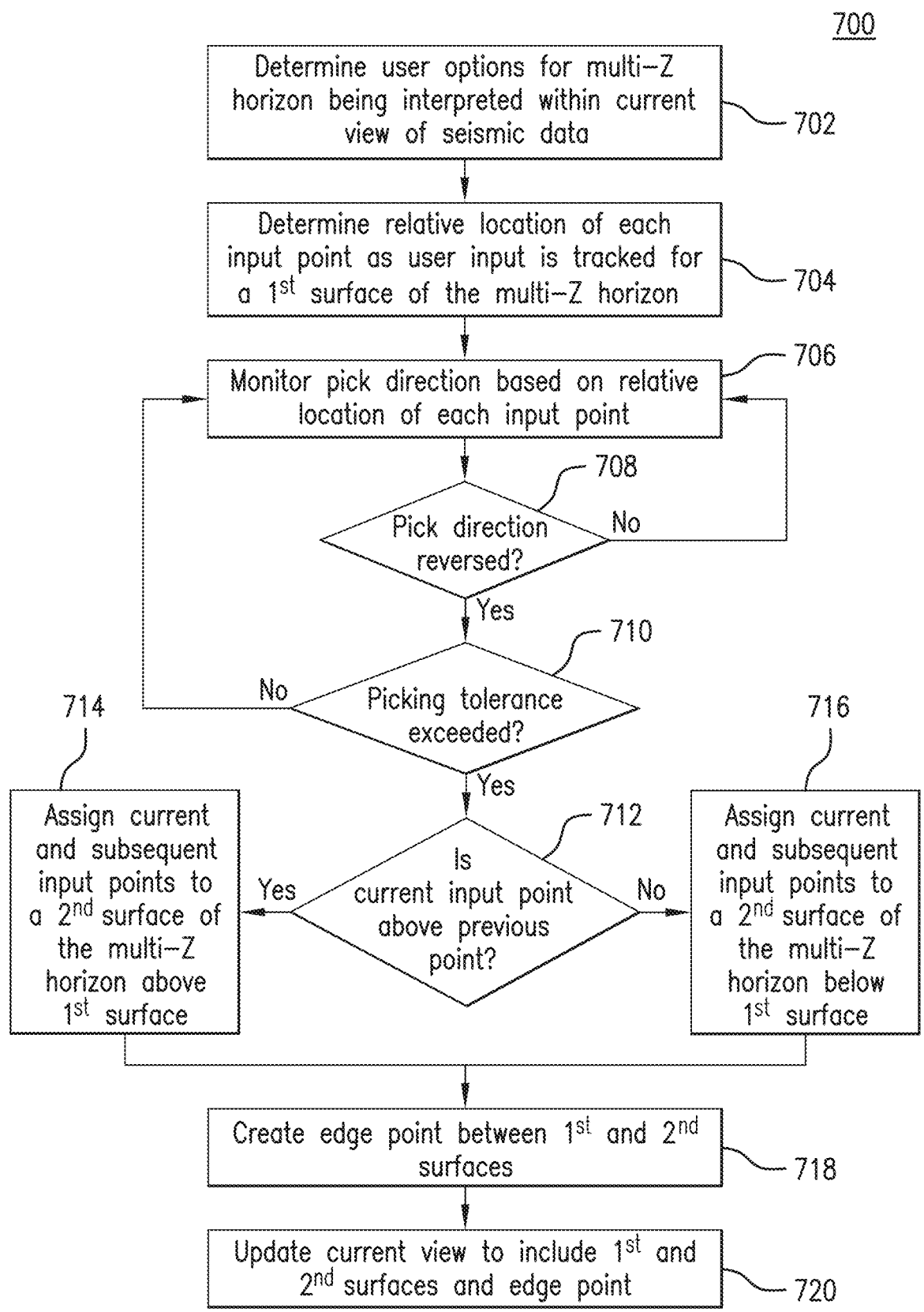
FIG. 7 is a flowchart of an illustrative process for determining overturned surfaces and at least one edge point for a multi-Z horizon being interpreted within a current view of seismic data.

FIG. 7 is a flowchart of an illustrative process 700 for determining continuous or overturned surfaces and at least one edge point for a multi-Z horizon. As described above, the edge point may be a point along an edge of the multi-Z horizon at which at least two of the surfaces intersect. Examples of such edge points between overturned surfaces are shown in FIGS. 5B and 5C, as described above. As shown in FIG. 7, process 700 begins in block 702, which includes determining various options for picking surfaces of the multi-Z horizon being interpreted within the current view of the seismic data displayed within the GUI. Examples of such options may include, but are not limited to, a mode of operation (e.g., a pick mode for picking new surfaces versus an edit mode for editing previously picked surfaces), visualization options for displaying each picked surface within the current view, and a picking tolerance for each surface. Such options may be specified by, for example, a user via an options window or settings panel of the GUI (e.g., GUI 130 or 200 of FIG. 1 or 2, respectively, as described above).

In one or more embodiments, a plurality of editing options may be provided as part of the edit mode of operation for making various adjustments or modifications to one or more previously picked surfaces of the multi-Z horizon. For example, the user may select one or more of these editing options via the GUI for specifying a type of adjustment or modification to be made along with any appropriate parameters for that type of modification. Examples of different types of editing options include, but are not limited to, a deletion option for deleting one or more surfaces or portions thereof, a reassignment option for reassigning selected points or portions of one surface to another (e.g., by removing a selected portion of a first surface and adding or replacing a corresponding portion of a second surface with the selected portion that was removed from the first surface), an edge point option for adding an edge point or adjusting the location or position of an existing edge point within the current view, and any other type of surface adjustment option for adjusting the location or properties of data points and/or edge points associated with a surface within the current view of the seismic data as displayed within the GUI. The parameters for a particular type of editing option may be specified by the user via different user options provided in the GUI. Examples of such user options include, but are not limited to, options for specifying an ID of a surface to be adjusted during the editing mode of operation and a minimum and/or maximum size of a segment of the surface to be automatically adjusted (e.g., deleted or reassigned) from that surface based on the input received from the user, as will be described in further detail below.

As described above, the GUI may include a content viewing area or visualization window for displaying a current view of seismic data for a vertical seismic section of a subsurface formation. The user in this example may use a user input device (e.g., mouse or other pointer device) to interact directly with the visualization window for purposes of picking different surfaces, e.g., a top surface and a bottom or base surface, of the multi-Z horizon from the displayed seismic data.

In one or more embodiments, the user may pick a surface of the multi-Z horizon or segments thereof by selecting different points along the seismic section as represented within the current view of seismic data displayed within the visualization window of the GUI. In one or more embodiments, the vertical section may be part of a 3D representation of the seismic data, and the selected points may correspond to different Z values along the "Z" or depth axis of the 3D coordinate space. However, it should be appreciated that the disclosed interpretation techniques are not limited to 3D representations or views of seismic data and that these techniques may be applied to 2D views of the data. For example, the current view displayed within the visualization window may be a 2D representation of a 3D seismic dataset, and the user may select points that correspond to different Z-values along a 2D vertical section of the seismic data as displayed within the current view.

In one or more embodiments, the surfaces of the multi-Z horizon may be picked by the user in a continuous progression from one surface to the next, e.g., by drawing the segments of a first surface (e.g., a top surface) in one direction and without Mopping, drawing the segments of the other surface (e.g., a base or bottom surface) in the opposite or reverse direction. For example, the visualization window of the GUI may provide a virtual canvas that enables the user to pick each surface by drawing and/or manipulating segments of that surface directly on the displayed seismic data. The user in this example may draw a segment of a surface by continuously depressing a left mouse button and moving the position of a mouse pointer along a portion of the seismic data displayed within the visualization window. Alternatively, the user may draw a segment by selecting at least two points within the seismic data and a line connecting the two points may be automatically drawn.

As described above with respect to block 606 of process 600, the user input for each surface of the multi-Z horizon may be tracked as it is detected or received via the GUI over a series of input points along one or more seismic data traces that correspond to the seismic section or portion thereof within the current view. Returning to block 704 of process 700, the relative location of each input point may be determined as the user input is tracked for a first surface (e.g., top surface) of the multi-Z horizon.

In block 706, a pick direction may be monitored based on the relative locations of consecutive input points within the current view of the seismic data. The pick direction may correspond to, for example, the direction of movement of a mouse or other pointer device used to draw a segment of the top surface along a portion of the vertical seismic section as displayed within the GUI. In one or more embodiments, block 706 may include tracking or monitoring the position or location of each input point as the input is continuously received from the user or user input device via the GUI, e.g., by tracking a mouse pointer or cursor indicating such position on a display device as it is moved by the user within the current view of the seismic data displayed within the GUI.

In one or more embodiments, the picking direction monitored in block 706 along with the picking tolerance set in block 702 may be used to automatically determine which surface of the multi-Z horizon is being picked at a given point in time, as continuous input is received from the user via the user input device. In one or more embodiments, the picking tolerance may represent a difference threshold between depth (or "Z") values corresponding to current and preceding input points (or user-selected points) detected over a period of time in which continuous input is received from the user. Thus, the picking tolerance may represent the minimum amount by which the Z values between consecutive input points must differ in order to detect or infer from the received input that the user is picking (or intends to pick) a different surface of the multi-Z horizon from one input point to the next.

Based on the monitoring in block 706, it may be determined in block 708 whether or not the pick direction or direction of the user input has reversed from one input point to the next. If no change in direction has been detected, process 700 returns to block 706 for continuing to monitor the pick direction while tracking the input received from the user. While not shown in FIG. 7, it should be appreciated that the current view may be dynamically updated as the user input is tracked and each portion or segment of the top surface is being drawn by the user (e.g., as the user continues to depress a left mouse button and move the mouse pointer within the visualization window) and until no further input is received from the user (e.g., until the user stops depressing the button).

However, if it is determined in block 708 that the pick direction has reversed, process 700 continues to block 710. Block 710 includes determining whether a difference between the Z value at the current input point in the reverse pick direction and the value at the preceding input point in the original pick direction (or a distance between these input points) exceeds the picking tolerance set in block 702, as described above. If it is determined in block 710 that this difference does not exceed the picking tolerance, process 700 returns to block 706 and the operations in blocks 706, 708 and 710 are repeated.

Otherwise, if it is determined in block 710 that the difference exceeds the picking tolerance, it may be assumed that the current input point in the reverse picking direction corresponds to a second surface of the multi-Z horizon, which is either above or below (e.g., at a depth above or below) the previously picked first surface within the current view of the displayed seismic data, and process 700 may proceed to block 712.

Block 712 includes determining whether the relative position of the current input point (and corresponding second surface) is above or below the previous input point (and corresponding first surface). For example, if it is determined in block 712 that the current input point is above the previous input point, process 700 proceeds to block 714, in which the current and any subsequent input points may be assigned to the second surface as a new surface that is currently being picked by the user above the previously picked first surface. Alternatively, if it is determined in block 712 that the current input point is below the previous input point, process 700 proceeds to block 716, in which the current and any subsequent input points may be assigned to the second surface as a new surface that is currently being picked by the user below the previously picked first surface. As described above, each surface that is picked by the user may be assigned a numerical identifier (or "ID") corresponding to a level or depth position of that surface relative to other surfaces of the multi-Z horizon, where the surface at the top-most level or highest depth position (with smallest depth value) may be assigned an ID of "1" and the remaining surfaces at lower levels or depth positions (with larger depth values) may be assigned relatively increasing integer IDs (e.g., "2" for the second highest surface, "3" for the surface third highest surface, and so on).

Following either block 714 or 716, process 700 may proceed to block 718, which includes creating or defining an edge point connecting the first surface, as previously picked by the user, and the second surface that is currently being picked by the user. In one or more embodiments, the edge point may be defined automatically, without any user intervention, based on the input points corresponding to the first and second surfaces drawn by the user within the current view of the seismic data as displayed within the visualization window of the GUI, as described above. For example, the edge point may be defined by interpolating its location or position and corresponding Z value relative to the locations and Z values of the input points associated with each surface.

Process 700 may then proceed to block 720, in which the current view of the seismic data as displayed within the visualization window of the GUI is updated to include a visual indication of the first and second surfaces of the multi-Z horizon as picked by the user. However, it should be appreciated that the current view of the seismic data within the visualization window may be dynamically updated as each surface of the multi-Z horizon is picked by the user, i.e., as the user input for each surface is received via the GUI, as described above. Although not shown in FIG. 7, process 700 may further include operations for storing the multi-Z horizon, including the various surfaces picked by the user, in memory (e.g., as multi-Z horizon data 124 within memory 120 of FIG. 1, as described above) for later access and retrieval.

Figure 8:
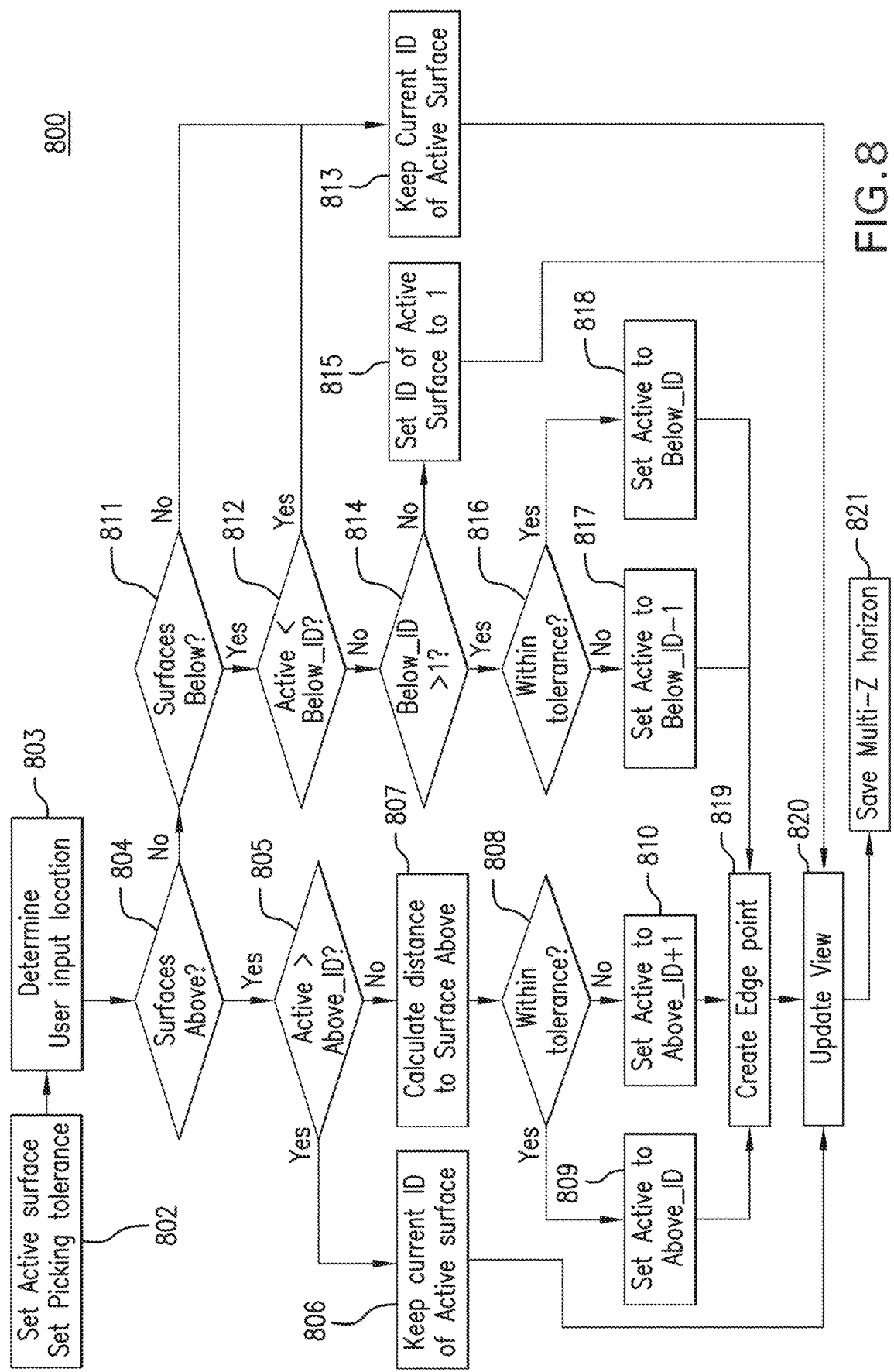
FIG. 8 is a flowchart of an illustrative process for determining faulted surfaces and at least one edge point for a multi-Z horizon being interpreted within a current view of seismic data.

FIG. 8 is a flowchart of an illustrative process 800 for interpreting a multi-Z horizon having faulted surfaces, such as those associated with a reverse fault or similar geological structure. In contrast with the multi-Z surfaces of the multi-Z horizon interpreted using process 700 of FIG. 7, as described above, the surfaces of the multi-Z horizon in this example are non-continuous or disconnected. An example of such non-continuous or disconnected multi-Z horizon surfaces is shown in FIG. 5A. The surfaces of the multi-Z horizon, e.g., surfaces 510A and 520A of FIG. 5A, and associated pick locations may be separated by one or more reverse faults, e.g., reverse fault 530 of FIG. 5A.

Process 800 begins in block 802, which includes setting an active surface of the multi-Z horizon to be picked by a user within a current view of seismic data displayed via a GUI, as described above, as well as a picking tolerance for each surface of the multi-Z horizon. As described above, the GUI may include a content viewing area or visualization window for displaying a 2D or 3D representation of seismic data for a vertical seismic section of a subsurface formation. In one or more embodiments, the seismic data may be displayed as a 2D representation of seismic traces corresponding to the vertical seismic section or portion thereof. A user may use a user input device (e.g., mouse or other pointer device) to interact directly with the visualization window for purposes of picking different surfaces of the multi-Z horizon from the displayed seismic data.

The active surface in this example may correspond to any one of various faulted surfaces of the multi-Z horizon being interpreted. As shown in FIG. 4B and described above, each surface of the multi-Z horizon may be assigned a different integer ID according to its depth or position along the Z-axis relative to the other surfaces, and the surfaces may appear in ascending order with ID numbers increasing from the topmost surface to the bottom-most or deepest surface (e.g., from 1 to N, where N may be any integer value). In one or more embodiments, the active surface and picking tolerance set in block 802 may be based on user input received via the GUI. For example, a user may select an ID of the active surface to be picked within the current view of seismic data and a picking tolerance for the surface via a dropdown menu or other type of user control displayed within an options window of e GUI, user options window 206 of GUI 200 of FIG. 2, as described above.

Once the active surface and picking tolerance have been set in block 802, process 800 proceeds to block 803, which includes determining the location of each user input as it is received or detected via the visualization window of the GUI. The user input for the active surface of the multi-Z horizon in this example may be received via the GUI over a series of input points along one or more seismic traces that correspond to the seismic section or portion thereof within the current view.

In block 804, it is determined whether or not any data points or previously detected input points corresponding to a previously picked surface of the multi-Z horizon exist above the location determined for a current input point detected or received for the active surface being picked by the user within the current view of the seismic data. An input point associated with such a previously picked surface may be located above the current input point along the same seismic trace, for example, as shown by input point 304 above input point 305 along Trace 4 in seismic section 300A of FIG. 3A. If it is determined in block 804 that a previously picked surface exists above the current input point or active surface, process 800 proceeds to block 805 and the operations in blocks 805-810 are performed.

Block 805 includes determining whether or not the ID of the active surface is greater than that of the existing surface above. If so, process 800 proceeds to block 806 and the current ID of the active surface is kept the same, after which the current view is updated in block 820 based on the received user input and the multi-Z horizon including the active surface or portion thereof picked by the user is saved or stored to memory in block 821. However, if it is determined that the active surface's ID is not greater than (i.e., less than or equal to) the existing surface's ID, process 800 proceeds to block 807, which includes calculating the distance from the current input point to the surface above (or nearest point of that surface along the same seismic trace).

Process 800 then proceeds to block 808, which includes determining whether or not the calculated distance is within the picking tolerance set in block 802. If the current input point is within the picking tolerance, then process 800 proceeds to block 809 and the ID of the active surface is set to the same as that of the surface above. Otherwise, process 800 proceeds to block 810 and the ID of the active surface is set to one more than the ID of the existing surface above, i.e., an ID that is equivalent to the existing surface ID incremented by a value of one.

As described above, the operations in blocks 805-810 are performed if it is determined in block 804 that at least one surface of the multi-Z horizon exists above the current input point for the active surface being picked by the user. However, if it is determined in block 804 that no surfaces of the multi-Z horizon exist above the current input point for the active surface being picked by the user within the current view, process 800 proceeds to block 811 and the operations in blocks 811-818 are performed instead.

Block 811 includes determining whether or not any previously picked surfaces of the multi-Z horizon exist below the current input point for the active surface. If it is determined in block 811 that no surface exists below the current input point, process 800 proceeds to block 813 and the current ID of the active surface is kept the same. After block 813, the current view is updated in block 820 based on the received user input and the multi-Z horizon including the active surface or portion thereof picked by the user is saved or stored to memory in block 821.

However, if it is determined in block 811 that at least one surface exists below the current input point of the active surface, process 800 proceeds to block 812, which includes determining whether or not the ID of the active surface is less than that of the existing surface below. If the active surface's ID is less than the ID of the existing surface below, process 800 proceeds to block 813, as described above.

Alternatively, if it is determined in block 812 that the active surface's ID is not less than (i.e., greater than or equal to) the existing surface's ID, process 800 proceeds to block 814, which includes determining whether or not the ID of the existing surface below is greater than a value of one. It is assumed for purposes of this example that an ID of "1" is reserved for the top-most or first surface of the multi-Z horizon, as described above.

If the ID of the surface below is not greater than one (i.e., the surface below has an ID of 1), indicating that the surface is the top-most or first surface, process 800 proceeds to block 815. Block 815 includes setting the ID of the active surface to 1 (i.e., to the same ID as that of the surface below), after which the current view is updated in block 820 based on the received user input and the multi-Z horizon including the active surface or portion thereof picked by the user is saved or stored to memory in block 821.

Alternatively, if the ID of the surface below is determined to be greater than one in block 814, process 800 proceeds to block 816, which includes calculating the distance from the current input point to the surface below (or nearest point of that surface along the same seismic trace). If the current input point is not within the picking tolerance, then process 800 proceeds to block 817 and the ID of the active surface is set to one less than the ID of the existing surface below, i.e., an ID that is equivalent to the existing surface's ID decremented by a value of one. Otherwise, process 800 proceeds to block 818 and the ID of the active surface is set to the same ID as that of the existing surface below.

As shown in FIG. 8, following the above-described operations in any of blocks 809, 810, 817 or 818, process 800 proceeds to block 819, in which an edge point is created between the active surface and the existing surface that is either above or below the active surface. In one or more embodiments, the location of such an edge point may defined based on the relative locations of the current input point of the active surface and at least one input point of the existing surface.

Process 800 may then proceed to block 820, in which the current view of seismic data displayed within the GUI is updated to include a visualization of the surfaces and the edge point between the surfaces. The multi-Z horizon, including the surfaces picked by the user and edge point created between the surfaces, may be saved or stored to memory, e.g., memory 120 of FIG. 1, as described above, in block 821.

Returning to FIG. 6, once the surfaces of the multi-Z horizon have been determined in block 608 (e.g., using process 700 of FIG. 7 for overturned surfaces or process 800 of FIG. 8 for faulted surfaces, as described above), process 600 may proceed to block 610, which includes updating the current view of the seismic data as displayed within the GUI to include a visual indication of the plurality of surfaces and the at least one edge point of the multi-Z horizon.

In one or more embodiments the multi-Z horizon with the corresponding edge point(s) between picked surfaces may be saved or stored to memory, e.g., memory 120 of FIG. 1, as described above. The saved multi-Z horizon may then be edited or updated by the user, as will be described below with reference to FIGS. 9A-13D.

Figure 9B:
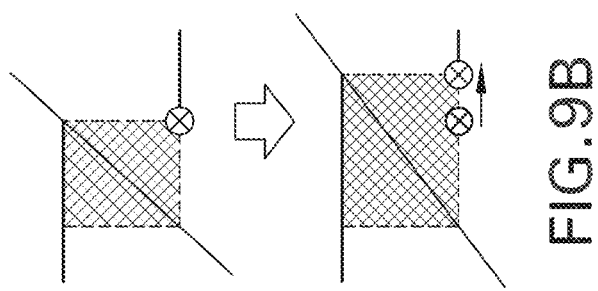
FIGS. 9A and 9B are diagrams of different multi-Z horizons with adjustments to edge points between the surfaces of each multi-Z horizon.
Figure 9A:
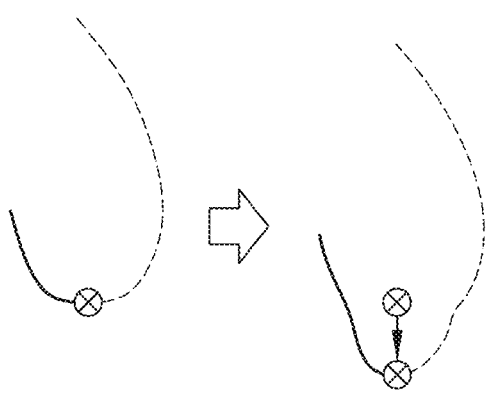

FIGS. 9A and 9B are diagrams of illustrative visualizations of multi-Z horizons with adjusted edge points connecting two consecutive surfaces of each multi-Z horizon. The edge point(s) of each multi-Z horizon may be adjusted by a user via an interactive GUI, e.g., GUI 130 of FIG. 1 or GUI 200 of FIG. 2, as described above. For example, the user may interact with the GUI to change the position of an edge point as that point is displayed with respect to the multi-Z horizon within a vertical seismic section. For example, the user may adjust the location of the edge point within the current view by dragging and dropping a representation of the edge point via the GUI.

As shown in FIG. 9A, the position of an edge point connecting consecutive surfaces of a multi-Z horizon representing an overturn bed may be moved by the user from its original location to a new location toward the left-hand side of the displayed representation. As a result, the surfaces connected by the edge point, both above (solid line) and below (dashed line) its current position, may be extended or otherwise updated according the edge point's new location, such that each surface remains connected to the edge point at the new location. FIG. 9B illustrates the result of editing the edge point between two consecutive surfaces of a multi-Z horizon representing a reverse fault. The position of the edge point in this example may be moved by the user from left to right along the horizon below the reverse fault. As a result, a portion of the first surface (solid line) between the starting and ending positions of the edge point may be reassigned to the second surface (dashed line). Additionally, the first surface located above the reserve fault may be extended to match the edge point's position at the new location.

Figure 10:
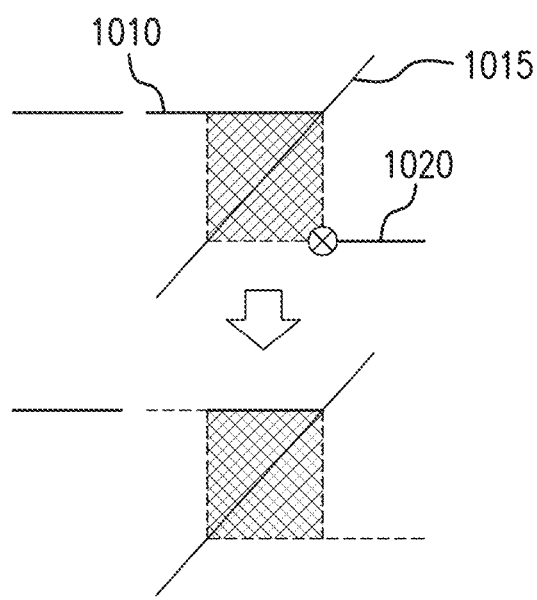
FIG. 10 is a diagram of an illustrative visualization of a multi-Z horizon in the form of a reverse fault with one or more selected points reassigned from one surface of the multi-Z horizon to another.

FIG. 10 is a diagram of an illustrative visualization of a multi-Z horizon, in the form of a reverse fault, with one or more selected points reassigned from one surface of the multi-Z horizon to the other. The surfaces of the multi-Z horizon in this example may appear on the same or opposite sides of the reverse fault, where portions of the same surface may be disconnected by the reverse fault. For example, the user may reassign one or more selected points from different portions of a first surface (solid line) of the multi-Z horizon shown in FIG. 10 (e.g., a portion 1010 of the first surface above a reverse fault 1015 and a portion 1020 of the first surface below reverse fault 1015) to a second surface (dashed line) of the multi-Z horizon. In one or more embodiments, a user may reassign the selected surfaces or portions thereof by performing some predefined input gesture, e.g., double-clicking the left or right mouse button after placing the mouse pointer or cursor at the location of a point along the first surface that the user wishes to reassign to the second surface. However, it should be appreciated that the disclosed techniques are not limited thereto and that these techniques may be applied using similar input gestures with any of various user input devices. In one or more embodiments, the edge points of a multi-Z horizon may be shown as circular shapes connected by polylines corresponding to the surfaces of the multi-Z horizon. However, it should be appreciated that any of various shapes or type of visual marker may be used to represent each edge point. The surfaces of the multi-Z horizon may be dynamically recomputed and displayed within a predetermined radius of the seismic section as an edge point is adjusted by the user via the GUI.

Figure 11:
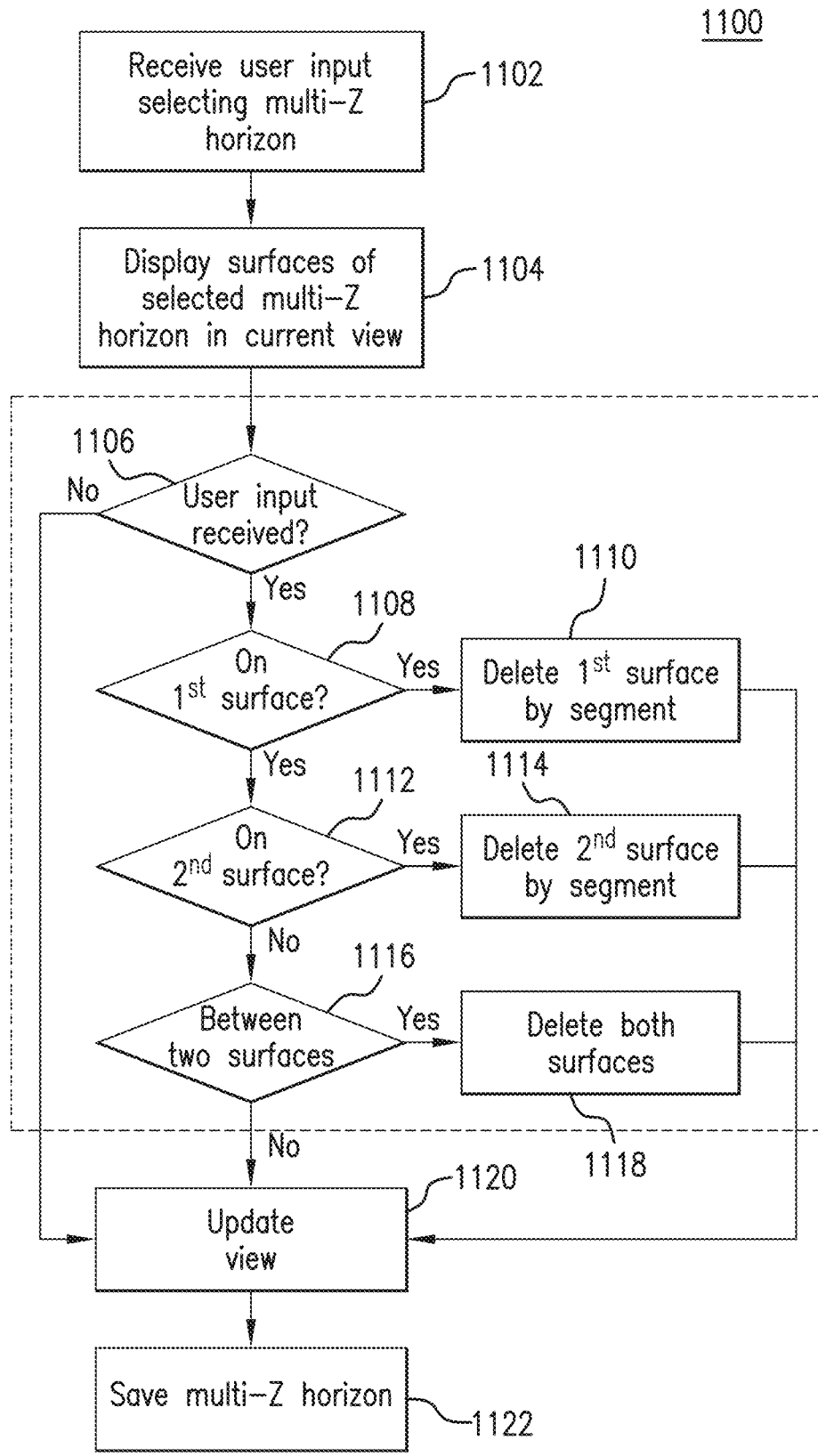
FIG. 11 is a flowchart of an illustrative process for deleting a portion of a visualized multi-Z horizon based on user-specified deletion points corresponding to one or more surfaces of the multi-Z horizon.

FIG. 11 is a flowchart of an illustrative process 1100 for deleting a portion of a previously interpreted multi-Z horizon based on user-specified deletion points corresponding to one or more surfaces of the multi-Z horizon. The surfaces of the multi-Z horizon in this example may include at least two surfaces that were previously picked or defined based on user input received via a current view of seismic data displayed within an interactive content area or visualization window of a GUI, e.g., GUI 130 of FIG. 1, as described above, for a seismic interpretation application. Further, the multi-Z horizon may be one of a plurality of multi-Z horizons interpreted based on the user input received via the GUI of the seismic interpretation application. For discussion purposes, process 1100 will be described using the multi-Z horizon examples illustrated in FIGS. 12A and 12B. However, process 1100 is not intended to be limited thereto.

Process 1100 begins in block 1102, in which input may be received from a user selecting at least one previously interpreted multi-Z horizon to be displayed in a current view of the seismic data within the visualization window of the GUI. In block 1104, the surfaces of the selected multi-Z horizon are displayed in the current view and process 1100 waits for additional input from the user with respect to the displayed surfaces. The user input may be, for example, a single click of a mouse button (or "mouse click") by the user specifying a deletion point on the displayed multi-Z horizon.

If it is determined in block 1106 that such user input is received, process 1100 proceeds to blocks 1108, 1112, or 1116 for determining whether the received input corresponds to a point on a first surface, on a second surface, or between the two surfaces, respectively. If it is determined in block 1108 that the received user input (or user-specified deletion point) corresponds to the first surface or a segment thereof, the first surface or segment is deleted in block 1110. For example, the user-specified deletion point based on the input received from the user (in block 1106, as described above) may correspond to a segment 1210A of a first faulted surface of the multi-Z horizon, as shown above the arrow in FIG. 12A. Thus, segment 1210A may be deleted, as shown below the arrow in FIG. 12A.

Alternatively, a portion of a selected one of the two surfaces may be deleted based on the proximity of each surface relative to the location of the received input within the current view of the seismic data. The selected surface may be, for example, the surface having the closest proximity to the location of the received input. Thus, while not shown in FIG. 11, the deletion operation in block 1118 of process 1100 may involve deleting at least a portion of the selected surface rather than deleting both of the surfaces or respective portions thereof. Accordingly, block 1118 in some embodiments may include determining which of the two surfaces is located closest (or has the closest proximity) to a received input point, based on a distance between the input point and the nearest point associated with each surface and then, deleting a portion of one of the two surfaces (either above or below the input point) that is determined to be the closest (or have the closest proximity).

Also, while not shown in FIG. 11, the location of the received input may correspond to, for example, an edge point between at least two of the surfaces of the multi-Z horizon. Therefore, the deletion operation in this example may involve deleting the edge point. Additional input may then be received from the user via the GUI for selecting the location of a new edge point, e.g., during an edge point editing mode of operation. In some implementations, the endpoints of the surfaces associated with the deleted edge point may be automatically adjusted to the location of the new edge point within the current view.

Returning to FIG. 11, if it is determined in block 1112 that the user-specified deletion point corresponds to the second surface instead, the second surface is deleted in block 1114. In one or more embodiments, an individual segment of either the first or second surface, e.g., a segment of the surface that was individually drawn by the user when the particular surface was initially picked from the seismic data via the GUI or other predefined length for a segment of the surface, may be deleted in block 1110 or block 1114 instead of the entire surface.

Figure 12A:
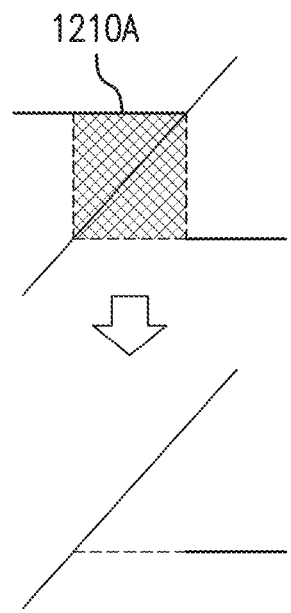
FIGS. 12A and 12B are diagrams illustrating the deletion of different portions of a multi-Z horizon based on user-selected deletion points.
Figure 12B:
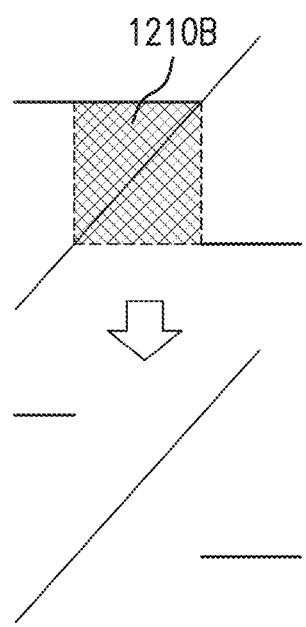

On the other hand, it may be determined that the user-specified deletion point does not correspond to either of the first and second surfaces (blocks 1108 and 1112) and instead, corresponds to an area between the two surfaces (block 1116). In this case, any portions of both first and second surfaces that intersect this area may be deleted in block 1118. For example, the portions of the faulted surfaces intersecting an area 1210B of the multi-Z horizon shown in FIG. 12B are deleted.

Returning again to FIG. 11, the displayed multi-Z horizon within the current view is updated in block 1120, following block 1110, 1114 or 1118. In block 1122, the multi-Z horizon, including any changes thereto, is saved or stored in memory.

Process 1100 allows a user to easily delete one or more previously picked multi-Z surfaces as a whole or by segment, e.g., according to a predefined segment length or the portions of each surface that correspond to an area between the surfaces. While only first and second surfaces are described for the multi-Z horizon in this example, it should be appreciated that embodiments are not intended to be limited thereto and that the disclosed multi-Z deletion techniques may be applied to multi-Z horizons having any number of surfaces.

Figure 13A:
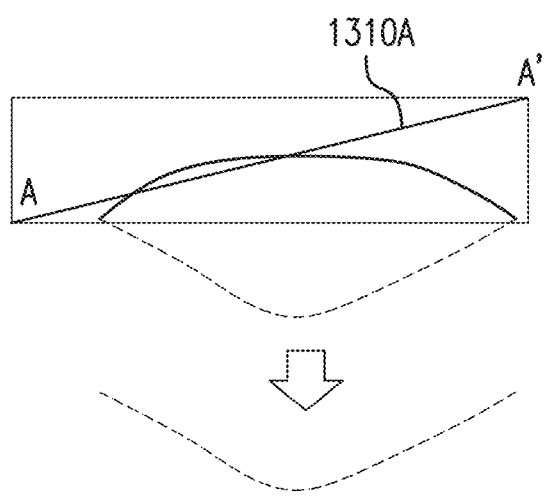
FIGS. 13A, 13B, 13C and 13D are diagrams illustrating the deletion of different portions of a multi-Z horizon based on a user-specified range of Z values corresponding to the each portion to be deleted.
Figure 13B:
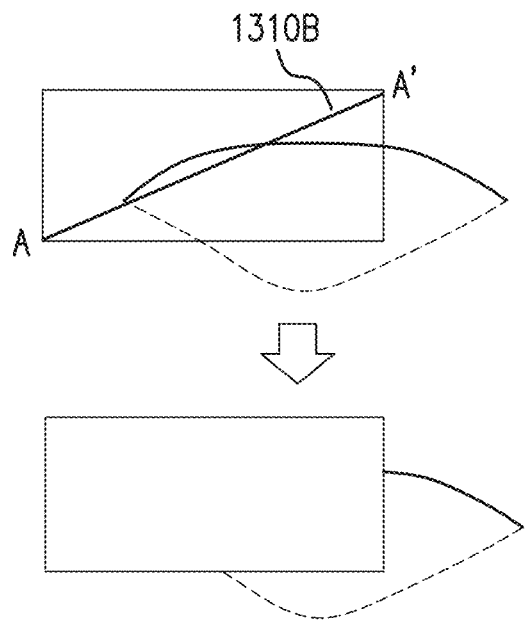

FIGS. 13A-13D are diagrams illustrating additional examples for deleting a portion of a multi-Z horizon based on a user-specified range of Z values corresponding to the particular portion to be deleted. Each of these examples may involve deleting a portion of a horizon within a horizontal/lateral distance defined between at least two Z values at points specified by the user. Such user-specified points may be based on consecutive mouse clicks by the user with respect to an area of the seismic data displayed within the visualization window of the GUI, as described above. For example, as shown in FIG. 13A, the user may use a user input device (e.g., a mouse or other pointer device) to draw or specify the endpoints of a line 1310A through a surface to be deleted from the multi-Z horizon. Similarly, in FIG. 13B, the user may draw a bounding box 1310B to specify or define the boundaries of an area of the multi-Z horizon to be deleted. The area defined by bounding box 1310B may include portions of one or more surfaces to be deleted from the multi-Z horizon.

Figure 13C:
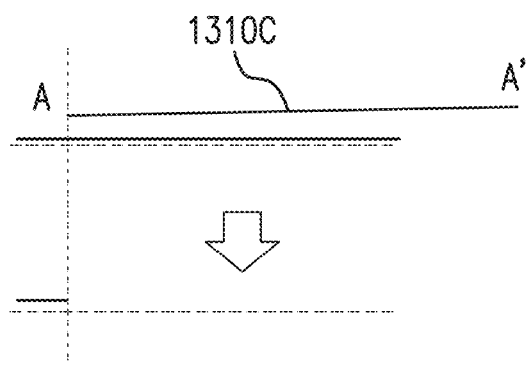
Figure 13D:
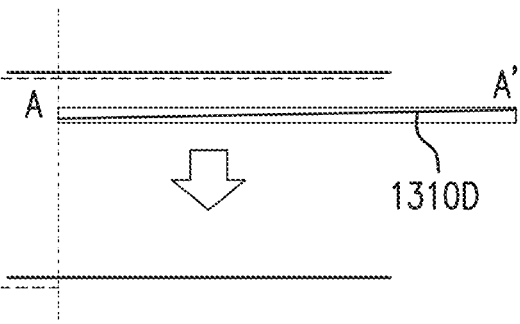

Furthermore, as shown in FIGS. 13C and 13D, the user may simply draw a line 1310C or 1310D above a top-most surface or below a bottom-most surface, respectively, in order for a corresponding portion of that surface to be deleted. This allows users specify particular portions of a surface for deletion, even when there is near zero vertical separation between the surfaces or grids representing each surface. It should be appreciated that lines 1310C and 1310D may be drawn at any distance from the respective surfaces to be deleted in FIGS. 13C and 13D and that this distance may be predetermined or controlled as desired for a particular implementation.

As described above, the disclosed seismic interpretation techniques improve over conventional solutions by enabling users to quickly and easily modify previously defined surfaces of a multi-Z horizon directly within an interactive content area or visualization window of GUI in which the multi-Z horizon is displayed. For example, such an interactive GUI enables users to delete selected portions of each surface of a multi-Z horizon individually or delete portions from multiple surfaces at the same time. In contrast with conventional solutions, the disclosed interpretation techniques allow users to avoid the tedious process of having to manually "clean" individual segments across an entire picked surface of a multi-Z horizon so as not to impact the adjacent segments. This not only improves user experience but also reduces the time required for interpreting new multi-Z horizons and/or modifying previously interpreted horizons, thereby improving the efficiency of the overall seismic interpretation workflow.

Figure 14:
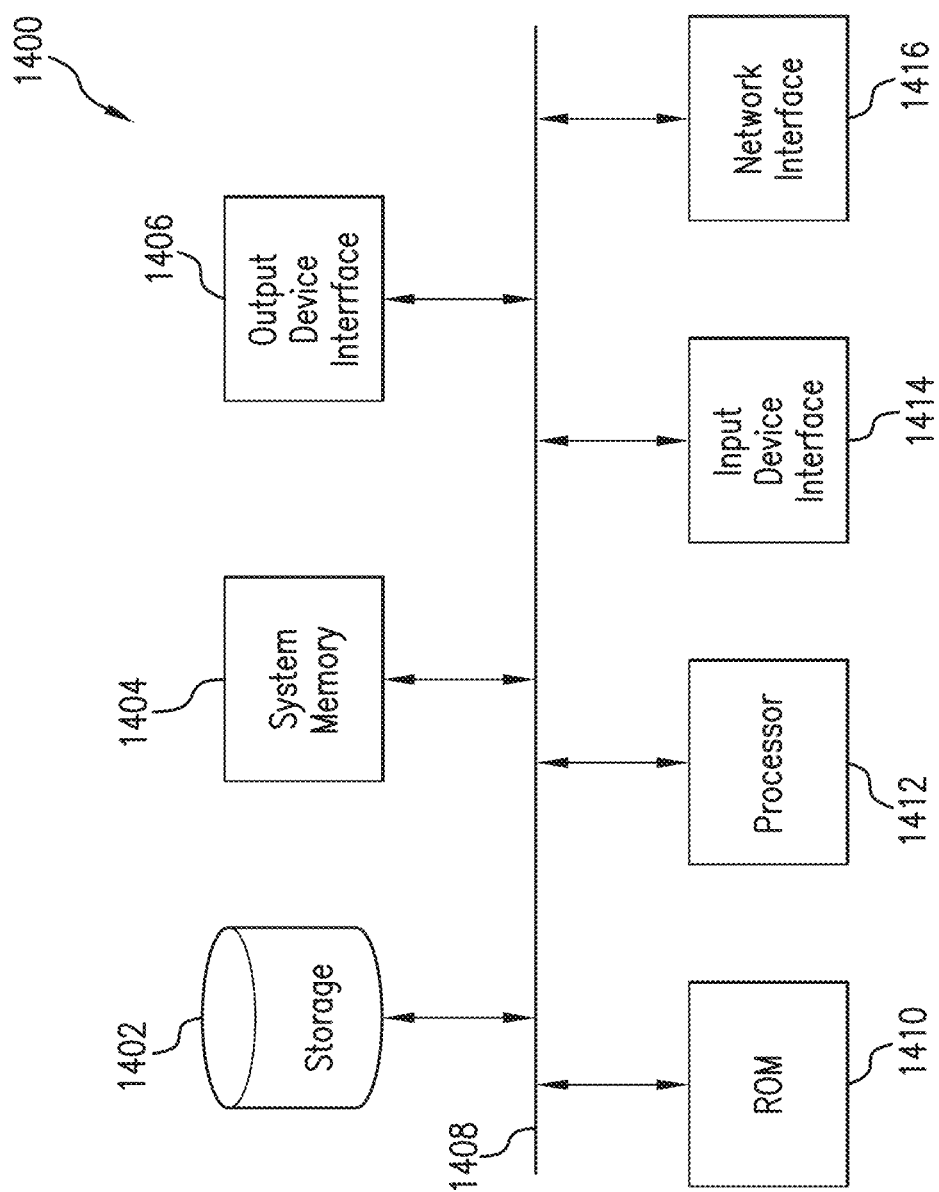
FIG. 14 is a block diagram illustrating an example of a computer system in which embodiments of the present disclosure may be implemented.

FIG. 14 is a block diagram illustrating an example of a computer system 1400 in which embodiments of the present disclosure may be implemented. For example, processes 600, 800, 900 and 1100 of FIGS. 6, 8, 9 and 11, respectively, as described above, may be implemented using system 1400. System 1400 can be a computer, phone, PDA, or any other type of electronic device. Such an electronic device includes various types of computer readable media and interfaces for various other types of computer readable media. As shown in FIG. 14, system 1400 includes a permanent storage device 1402, a system memory 1404, an output device interface 1406, a system communications bus 1408, a read-only memory (ROM) 1410, at least one processor or processing unit(s) 1412, an input device interface 1414, and a network interface 1416.

Bus 1408 collectively represents all system, peripheral, and chipset buses that communicatively connect the numerous internal devices of system 1400. For instance, bus 1408 communicatively connects processing unit(s) 1412 with ROM 1410, system memory 1404, and permanent storage device 1402.

From these various memory units, processing unit(s) 1412 retrieves instructions to execute and data to process in order to execute the processes of the subject disclosure. The processing unit(s) 1412 can be a single processor or a multi-core processor in different implementations.

ROM 1410 stores static data and instructions that are needed by processing unit(s) 1412 and other modules of system 1400. Permanent storage device 1402, on the other hand, is a read-and-write memory device. This device is a non-volatile memory unit that stores instructions and data even when system 1400 is off. Some implementations of the subject disclosure use a mass-storage device (such as a magnetic or optical disk and its corresponding disk drive) as permanent storage device 1402.

Other implementations use a removable storage device (such as a floppy disk, flash drive, and its corresponding disk drive) as permanent storage device 1402. Like permanent storage device 1402, system memory 1404 is a read-and-write memory device. However, unlike storage device 1402, system memory 1404 is a volatile read-and-write memory, such a random access memory. System memory 1404 stores some of the instructions and data that the processor needs at runtime. In some implementations, the processes of the subject disclosure are stored in system memory 1404, permanent storage device 1402, and/or ROM 1410. For example, the various memory units include instructions for computer aided pipe string design based on existing string designs in accordance with some implementations. From these various memory units, processing unit(s) 1412 retrieves instructions to execute and data to process in order to execute the processes of some implementations.

Bus 1408 also connects to input and output device interfaces 1414 and 1406. Input device interface 1414 enables the user to communicate information and select commands to the system 1400. Input devices used with input device interface 1414 include, for example, alphanumeric, QWERTY, or T9 keyboards, microphones, and pointing devices (also called "cursor control devices"). Output device interfaces 1406 enables, for example, the display of images generated by the system 1400. Output devices used with output device interface 1406 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 14, bus 1408 also couples system 1400 to a public or private network (not shown) or combination of networks through a network interface 1416. Such a network may include, for example, a local area network ("LAN"), such as an Intranet, or a wide area network ("WAN"), such as the Internet. Any or all components of system 1400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 600, 800, 900 and 1200 of FIGS. 6, 8, 9 and 12, respectively, as described above, may be implemented using system 1400 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

In one or more embodiments, system 1400 may be used to implement the disclosed techniques as a component of a distributed computing system, for example, as a back end component, e.g., a data server, a middleware component, e.g., an application server, a front end component, e.g., a client computer having a graphical user interface or a Web browser through which a user can interact with an implementation of the subject matter described in this specification, or any combination of such back end, middleware, and front end components of the distributed computing system. The components of the distributed system can be interconnected by any form or medium of digital data communication, e.g., a communication network. Examples of communication networks include, but are not limited to, a local area network ("LAN") and a wide area network ("WAN"), an inter-network (e.g., the Internet), and peer-to-peer networks (e.g., ad hoc peer-to-peer networks).

It should be appreciated that such a distributed computing system can include any number of clients and servers. A client and server are generally remote from each other and typically interact through a communication network. The relationship of client and server may arise by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device a result of the user interaction) can be received from the client device at the server. In one or more embodiments, such a client device of the distributed computing system may be associated with a well system for performing downhole operations at a well site, as will be described in further detail below with respect to FIG. 15.

Figure 15:
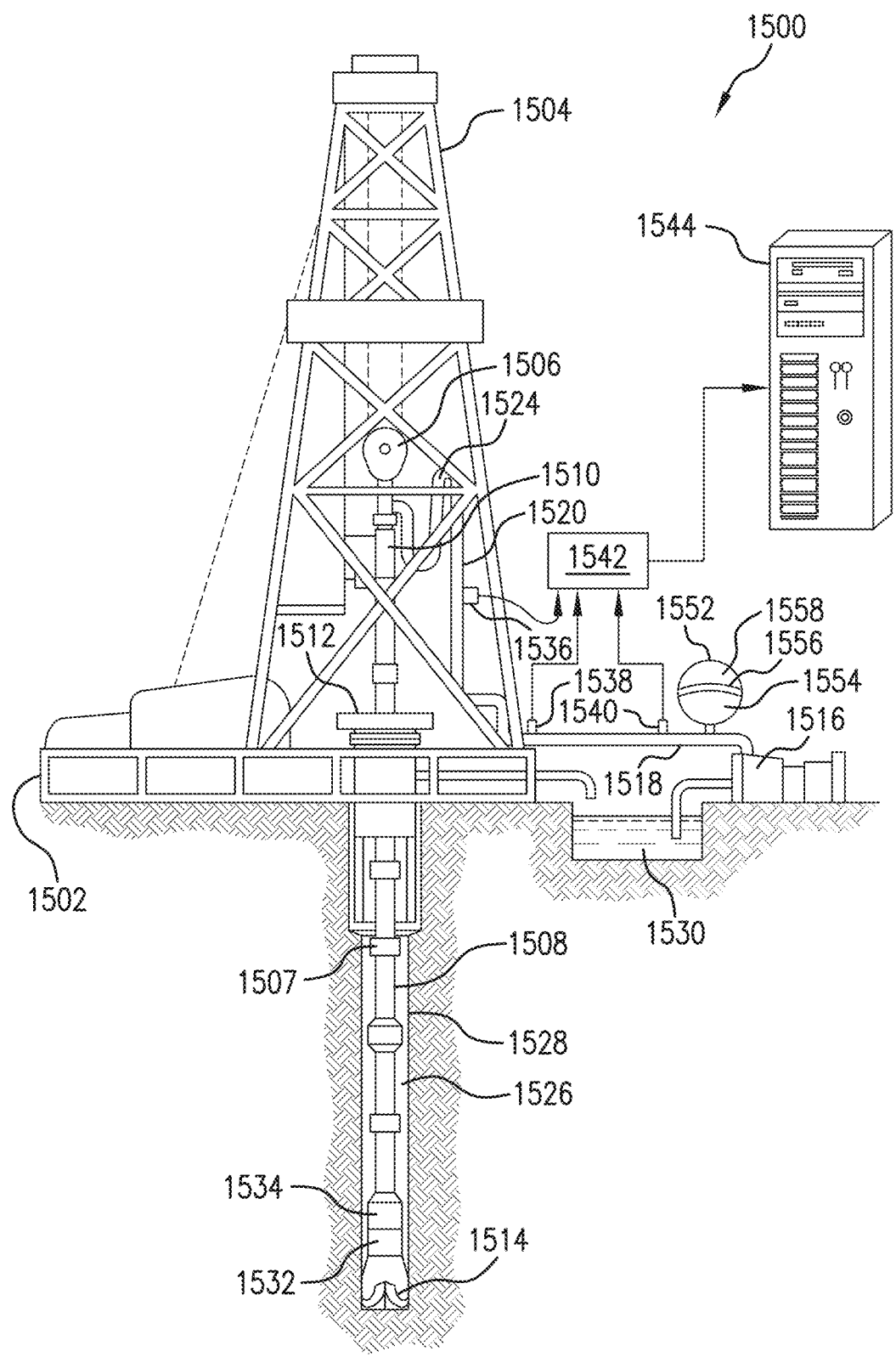
FIG. 15 is a diagram of an illustrative well system for conducting a downhole operation at a well site.

FIG. 15 is a diagram of an illustrative well system 1500 for conducting a downhole operation at a well site. Although well system 1500 will be described in the context of a drilling operation, it should be appreciated that the disclosed techniques are not intended to be limited thereto and that these techniques may be applied to other types of downhole operations, e.g., production or stimulation operations. As shown in FIG. 15, well system 1500 includes a drilling platform 1502 located at the surface of a borehole or wellbore 1526. Wellbore 1526 is drilled into different layers of a subsurface rock formation using a drill string 1508 that includes a string of drill pipes connected together by "tool" joints 1507. Drilling platform 1502 is equipped with a derrick or drilling rig 1504 that supports a hoist 1506. Hoist 1506 suspends a top drive 1510 that is used to lower drill string 1508 through a wellhead 1512 and rotate drill string 1508 within wellbore 1526. Connected to the lower portion or distal end of drill string 1508 is a bottom hole assembly (BHA), which includes a drill bit 1514, at least one downhole tool 1532, and a telemetry device 1534. It should be appreciated that drill bit 1514, downhole tool 1532, and telemetry device 1534 may be implemented as separate components within a housing of the BHA at the end of drill string 1508. Although not shown in FIG. 15, it should also be appreciated that the BHA may include additional components for supporting various functions related to the drilling operations being conducted. Examples of such components include, but are not limited to, drill collars, stabilizers, reamers, and hole-openers.

Drilling of wellbore 1526 occurs as drill bit 1514 penetrates the subsurface formation while rotating at the end of drill string 1508. Drill bit 1514 may be rotated in conjunction with the rotation of drill string 1508 by top drive 1510. Additionally or alternatively, drill bit 1514 may be rotated independently from the rest of drill string 1508 by a downhole motor (not shown) positioned near drill bit 1514. Although wellbore 1526 is shown in FIG. 15 as a vertical wellbore, it should be appreciated that wellbore 1526 may be drilled in a non-vertical, horizontal, or near-horizontal direction, e.g., as a deviated well drilled at angles approaching or at 90 degrees from vertical.

Drilling fluid may be pumped at high pressures and volumes by a mud pump 1516 through a flow line 1518, a stand pipe 1520, a goose neck 1524, top drive 1510, and drill string 1508 to emerge through nozzles or jets in drill bit 1514. The drilling fluid emerging from drill bit 1514 travels back up wellbore 1526 via a channel or annulus formed between the exterior of drill string 1508 and a wellbore wall 1528. The drilling fluid then goes through a blowout preventer (not specifically shown) and into a mud pit 1530 at the surface, where the fluid is cleaned and recirculated by mud pump 1516 through drill string 1508 and wellbore 1526. The drilling fluid may be used for various purposes during the drilling operation including, but not limited to, cooling drill bit 1514, carrying cuttings from the base of the bore to the surface, and balancing the hydrostatic pressure in the rock formations.

Downhole tool 1532 may be used to collect information related to downhole drilling conditions and surrounding formation properties as wellbore 1526 is drilled over different stages of the drilling operation. Downhole tool 1532 may be, for example, a logging-while-drilling (LWD) or a measurement-while-drilling (MWD) tool for measuring such downhole conditions and formation properties. The measured downhole conditions may include, for example and without limitation, the movement, location, and orientation of the BHA or drilling assembly as wellbore 1526 is drilled within the formation. The measured formation properties may include, for example, one or more formation parameters around a circumference of wellbore 1526 at a particular depth within the formation. While only downhole tool 1532 is shown in FIG. 15, it should be appreciated that the disclosed embodiments are not limited thereto and that additional downhole tools (e.g., any number of MWD and/or MD tools) may be used.

In addition to measurements collected by downhole tool 1532, a seismic survey may be conducted to provide seismic mapping of the subsurface formation in this example. In order to conduct a seismic survey, one or more seismic source devices (not shown) at the surface of the formation generates seismic waves which travel into the subsurface layers. Such source devices may include, for example and without limitation, dynamite or other explosives, thumper trucks, air guns, or other noise sources. The seismic waves partially reflect off the subsurface geological features, e.g., horizons and faults, encountered by the seismic waves. The seismic waves reflected back towards the earth's surface are received by an array of seismic receivers, e.g., geophones, and arrival times and amplitudes are recorded.

Such a surface seismic survey may serve as an initial exploratory survey conducted over a relatively large area of the formation in order to obtain a low resolution mapping of the formation's geometry. Such a broad-based seismic survey may be used in conjunction with core samples and/or well logs from one or more exploratory wellbores for purposes of hydrocarbon exploration and well planning. From the initial exploratory survey, a target area within the formation may be selected for further exploration and well planning purposes. A more detailed vertical seismic profile (VSP) survey of the selected target area may then be conducted. To conduct the VSP survey, the waves of seismic energy and direct arrival times from the seismic source devices at the surface may be detected and recorded by an array of seismic receivers (not shown) disposed within wellbore 1526. In some implementations, the seismic receivers may be downhole seismic sensors, e.g., geophones or hydrophones, coupled to or integrated within the BHA of drill string 1508 alongside downhole tool 1532 and telemetry device 1534.

In one or more embodiments, telemetry device 1534 may be used to transmit the information collected by downhole tool 1532 and/or any downhole seismic sensors of the BHA to the surface of wellbore 1526. Telemetry device 1534 may be, for example, a part of a communications subsystem of drill string 1508. Telemetry device 1534 may be communicatively coupled to downhole tool 1532 and other sensors for receiving data related to the formation properties and downhole conditions measured and/or recorded by such measurement devices. Telemetry device 1534 may communicate the received data to the surface using any suitable communication channel (e.g., pressure pulses within the drilling fluid flowing in drill string 1508, acoustic telemetry through the pipes of the drill string 1508, electromagnetic telemetry, optical fibers embedded in the drill string 1508, or any combination thereof).

In the example shown in FIG. 15, well system 1500 may employ mud pulse telemetry for transmitting downhole information to the surface during the downhole operation. However, it should be appreciated that embodiments are not limited thereto and that any of various other types of data communication techniques may be used for sending the downhole information to the surface. Such techniques may include, for example and without limitation, wireless communication techniques and wireline or any other type of wired electrical communication techniques.

In the mud pulse telemetry example, telemetry device 1534 may encode the downhole information using a data compression scheme and transmit the encoded data to the surface by modulating the flow of drilling fluid through drill string 1508 so as to generate pressure pulses that propagate to the surface. The pressure pulses may be received at the surface by various transducers 1536, 1538 and 1540, which convert the received pulses into electrical signals for a signal digitizer 1542 (e.g., an analog to digital converter). While three transducers 1536, 1538 and 1540 are shown in FIG. 15, it should be appreciated that any number of transducers may be used as desired for a particular implementation. Digitizer 1542 supplies a digital form of the pressure signals to a data processing device or computer 1544.

In one or more embodiments, computer 1544 may function as a control system for monitoring and controlling downhole operations at the well site. Computer 1544 may be implemented using any type of computing device having at least one processor and a memory. Computer 1544 may process and decode the digital signals received from digitizer 1542 using an appropriate decoding scheme. For example, the digital signals may be in the form of a bit stream including reserved bits that indicate the particular encoding scheme that was used to encode the data downhole. Computer 1544 can use the reserved bits to identify the corresponding decoding scheme to appropriately decode the data. The resulting decoded telemetry data may be further analyzed and processed by computer 1544 to display useful information to a well site operator. For example, a driller could employ computer 1544 to obtain and monitor the position and orientation of the BHA (or one or more of its components), other drilling parameters, and/or one or more formation properties of interest over the course of the drilling operation. It should be appreciated that computer 1544 may be located at the surface of the well site, e.g., near drilling rig 1504, or at a remote location away from the well site. While not shown in FIG. 15, computer 1544 may be communicatively coupled to one or more other computer systems via a communication network, e.g., a local area, medium area, or wide area network, e.g., the Internet. Such other computer systems may include remote computer systems located away from the well site for remotely monitoring and controlling well site operations via the communication network.

To reduce noise in the downhole data received at the surface, well system 1500 may include a dampener or desurger 1552. Flow line 1518 couples to a drilling fluid chamber 1554 in desurger 1552. A diaphragm or separation membrane 1556 separates drilling fluid chamber 1554 from a gas chamber 1558. Desurger 1552 may include a gas chamber 1558 filled with nitrogen at a predetermined percentage, e.g., approximately 50% to 75% of the operating pressure of the drilling fluid. Diaphragm 1556 moves with variations in the drilling fluid pressure, enabling the gas chamber to expand and contract, thereby absorbing some of the pressure fluctuations. While desurger 1552 absorbs some pressure fluctuations, desurger 1552 and/or mud pump 1516 may also act as reflective devices. That is, pressure pulses propagating from telemetry device 1534 tend to reflect off desurger 1552 and/or mud pump 1516, sometimes a negative reflection, and propagate back downhole. The reflections create interference that, in some cases, adversely affects the ability to determine the presence of the pressure pulses propagating from telemetry device 1534.

In addition to transmitting information collected downhole to the surface, telemetry device 1534 may receive information from the surface over one or more of the above-described communication channels. The information received from the surface may include, for example, signals for controlling the operation of the BHA or individual components thereof. Such control signals may be used, for example, to update operating parameters of the BHA for purposes of adjusting a planned trajectory or path of wellbore 1526 through the formation during different stages of the drilling operation. In one or more embodiments, the control signals may be representative of commands input by a well site operator for making adjustments to the planned path or controlling various operational variables of the drilling operation as downhole conditions change over time. As described above, such operational variables may include, but are not limited to, weight on bit, drilling fluid flow through the drill pipe, the drill string rotational speed, and the density and viscosity of the drilling fluid.

In one or more embodiments, computer 1544 may provide an interface enabling the well site operator at the surface to receive indications of downhole operating conditions and controllable parameters and adjust one or more of the parameters accordingly. The interface may be include a display for presenting relevant information, e.g., values of drilling parameters or operational variables, to the operator during the drilling operation as well as a user input device (e.g., a mouse, keyboard, touch-screen, etc.) for receiving input from the operator. As downhole operating conditions may continually change over the course of the operation, the operator may use the interface provided by computer 1544 to react to such changes in real time by adjusting selected drilling parameters in order to increase and/or maintain drilling efficiency and thereby, optimize the drilling operation.

In one or more embodiments, computer 1544 may execute a well planning application for automating well planning and data analysis workflows during both planning and implementation phases of a downhole operation performed along a planned path of a wellbore through a subsurface formation. In some implementations, the well planning application may incorporate the functionality of the above-described seismic interpretation application. For example, the seismic interpretation application including the disclosed multi-Z horizon interpretation techniques may be implemented as a component of the well planning application. As will be described in further detail below, a GUI of the well planning application may be used to provide the multi-Z seismic interpretation functionality to a user, for example, as part of a seismic interpretation and Earth modeling workflow. Such a workflow may involve using the results of the seismic interpretation to generate a 2D or 3D model of the subsurface formation or to update an existing model. The generated or updated formation model may then be used to identify or modify potential targets within the formation for hydrocarbon exploration and production operations and adjust the planned path of the wellbore accordingly.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for interpreting multi-Z horizons from seismic data. In one embodiment of the present disclosure, a method of interpreting multi-Z horizons from seismic data includes: displaying seismic data within a graphical user interface (GUI) of an application executable at a computing device of a user; receiving, via the GUI, input from the user for picking a plurality of surfaces of a multi-Z horizon being interpreted within a current view of the displayed seismic data; tracking the user's input as it is received via the GUI over a series of input points within the current view of the displayed seismic data; determining each of the plurality of surfaces picked by the user for the multi-Z horizon and at least one edge point between the picked surfaces within the current view of the seismic data, based on the tracking; and updating the current view of the seismic data within the GUI to include a visual indication of the plurality of surfaces and the at least one edge point for the multi-Z horizon. In another embodiment of the present disclosure, a computer-readable storage medium having instructions stored therein is disclosed, where the instructions, when executed by a computer, cause the computer to perform a plurality of functions, including functions to: display seismic data within a graphical user interface (GUI) of an application executable at a computing device of a user; receive, via the GUI, input from the user for picking a plurality of surfaces of a multi-Z horizon being interpreted within a current view of the displayed seismic data; track the user's input as it is received via the GUI over a series of input points within the current view of the displayed seismic data; determine each of the plurality of surfaces picked by the user for the multi-Z horizon and at least one edge point between the picked surfaces within the current view of the seismic data, based on the tracking; and update the current view of the seismic data within the GUI to include a visual indication of the plurality of surfaces and the at least one edge point for the multi-Z horizon.

One or more embodiments of the foregoing method and/or computer-readable storage medium may further include any one or any combination of the following additional elements, functions or operations: displaying a two-dimensional (2D) representation of the seismic data, and the seismic data includes seismic traces corresponding to a vertical seismic section from a seismic survey of a subsurface formation; the plurality of surfaces include a pair of consecutive surfaces of the multi-Z horizon; the at least one edge point between the plurality of surfaces is located at each intersection between the consecutive surfaces of the multi-Z horizon; tracking comprises tracking a relative location of each of the input points within the current view as the user's input is received via the GUI, and determining comprises determining whether a direction of the user's input for picking the surfaces within the current view has changed between consecutive input points in the series, based on the tracked location of a current input point in the series relative to that of a previous input point, where, when it is determined that the direction of the user's input has not changed between the current and previous input points, the current and previous input points are assigned to a first of the plurality of surfaces of the multi-Z horizon, and when it is determined that the direction of the user's input has changed between the current and previous input points, a distance between the current and previous input points is calculated and the previous input point is assigned to the first surface of the multi-Z horizon and the corresponding input point to a second surface of the multi-Z horizon when the calculated distance exceeds a picking tolerance associated with at least one of the first surface or the second surface; each of the plurality of surfaces of the multi-Z horizon is assigned a numerical identifier based on that surface's depth relative to that of other surfaces in the plurality of surfaces, and surfaces having relatively smaller depth values are assigned relatively smaller numerical identifiers; the multi-Z horizon represents a geological structure of a subsurface formation; and the geological structure is selected from the group consisting of a reverse fault, a salt body, and overturned beds.

Furthermore, a system is disclosed, where the system includes at least one processor and a memory coupled to the processor having instructions stored therein, which when executed by the processor, cause the processor to perform functions including functions to: display seismic data within a graphical user interface (GUI) of an application executable at a computing device of a user; receive, via the GUI, input from the user for picking a plurality of surfaces of a multi-Z horizon being interpreted within a current view of the displayed seismic data; track the user's input as it is received via the GUI over a series of input points within the current view of the displayed seismic data; determine each of the plurality of surfaces picked by the user for the multi-Z horizon and at least one edge point between the picked surfaces within the current view of the seismic data, based on the tracking; and update the current view of the seismic data within the GUI to include a visual indication of the plurality of surfaces and the at least one edge point for the multi-Z horizon.

One or more embodiments of the foregoing system may further include any one or any combination of the following additional elements, functions or operations: displaying a two-dimensional (2D) representation of the seismic data, and the seismic data includes seismic traces corresponding to a vertical seismic section from a seismic survey of a subsurface formation; the plurality of surfaces include a pair of consecutive surfaces of the multi-Z horizon; the at least one edge point between the plurality of surfaces is located at each intersection between the consecutive surfaces of the multi-Z horizon; tracking comprises tracking a relative location of each of the input points within the current view as the user's input is received via the GUI, and determining comprises determining whether a direction of the user's input for picking the surfaces within the current view has changed between consecutive input points in the series, based on the tracked location of a current input point in the series relative to that of a previous input point, where, when it is determined that the direction of the user's input has not changed between the current and previous input points, the current and previous input points are assigned to a first of the plurality of surfaces of the multi-Z horizon, and when it is determined that the direction of the user's input has changed between the current and previous input points, a distance between the current and previous input points is calculated and the previous input point is assigned to the first surface of the multi-Z horizon and the corresponding input point to a second surface of the multi-Z horizon when the calculated distance exceeds a picking tolerance associated with at least one of the first surface or the second surface; each of the plurality of surfaces of the multi-Z horizon is assigned a numerical identifier based on that surface's depth relative to that of other surfaces in the plurality of surfaces, and surfaces having relatively smaller depth values are assigned relatively smaller numerical identifiers; the multi-Z horizon represents a geological structure of a subsurface formation; and the geological structure is selected from the group consisting of a reverse fault, a salt body, and overturned beds.

While specific details about the above embodiments have been described, the above hardware and software descriptions are intended merely as example embodiments and are not intended to limit the structure or implementation of the disclosed embodiments. For instance, although many other internal components of the computer systems 100 and 1400 of FIGS. 1 and 14, respectively, are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of interpreting multi-Z horizons from seismic data, the method comprising:
   displaying seismic data within a graphical user interface (GUI) of an application executable at a computing device of a user;
   receiving, via the GUI, input from the user for picking a plurality of surfaces of a multi-Z horizon being interpreted within a current view of the displayed seismic data;
   tracking the user's input as it is received via the GUI over a series of input points within the current view of the displayed seismic data, wherein a relative location of each of the input points is tracked within the current view as the user's input is received via the GUI;
   determining each of the plurality of surfaces picked by the user for the multi-Z horizon and at least one edge point between the picked surfaces within the current view of the seismic data, based on the tracking, wherein the determining comprises:
      determining whether a direction of the user's input for picking the surfaces within the current view has changed between consecutive input points in the series, based on the tracked location of a current input point in the series relative to that of a previous input point;
      when it is determined that the direction of the user's input has not changed between the current and previous input points, assigning the current and previous input points to a first of the plurality of surfaces of the multi-Z horizon; and
      when it is determined that the direction of the user's input has changed between the current and previous input points;
         calculating a distance between the current and previous input points; and
         assigning the previous input point to the first surface of the multi-Z horizon and the corresponding input point to a second surface of the multi-Z horizon when the calculated distance exceeds a picking tolerance associated with at least one of the first surface or the second surface; and
   updating the current view of the seismic data within the GUI to include a visual indication of the plurality of surfaces and the at least one edge point for the multi-Z horizon.

2. The method of claim 1, wherein displaying comprises: displaying a two-dimensional (2D) representation of the seismic data, and the seismic data includes seismic traces corresponding to a vertical seismic section from a seismic survey of a subsurface formation.

3. The method of claim 1, wherein the plurality of surfaces include a pair of consecutive surfaces of the multi-Z horizon.

4. The method of claim 3, wherein the at least one edge point between the plurality of surfaces is located at each intersection between the consecutive surfaces of the multi-Z horizon.

5. The method of claim 1, wherein each of the plurality of surfaces of the multi-Z horizon is assigned a numerical identifier based on that surface's depth relative to that of other surfaces in the plurality of surfaces, and surfaces having relatively smaller depth values are assigned relatively smaller numerical identifiers.

6. The method of claim 1, wherein the multi-Z horizon represent a geological structure of a subsurface formation.

7. The method of claim 6, wherein the geological structure is selected from the group consisting of: a reverse fault; a salt body; and overturned beds.

8. A system comprising:
   a processor; and
   a memory coupled to the processor and storing processor-readable instructions, which, when executed by the processor, cause the processor to perform a plurality of functions, including functions to:
   display seismic data within a graphical user interface (GUI) of an application executable at a computing device of a user;
   receive, via the GUI, input from the user for picking a plurality of surfaces of a multi-Z horizon being interpreted within a current view of the displayed seismic data;
   track the user's input as it is received via the GUI over a series of input points within the current view of the displayed seismic data, wherein a relative location of each of the input points is tracked within the current view as the user's input is received via the GUI;
   determine each of the plurality of surfaces picked by the user for the multi-Z horizon and at least one edge point between the picked surfaces within the current view of the seismic data, based on the tracking, wherein the functions performed by the processor to determine each surface picked by the user include functions to:
      determine whether a direction of the user's input for picking the surfaces within the current view has changed between consecutive input points in the series, based on the tracked location of a current input point in the series relative to that of a previous input point;
      when it is determined that the direction of the user's input has not changed between the current and previous input points, assign the current and previous input points to a first of the plurality of surfaces of the multi-Z horizon;
      when it is determined that the direction of the user's input has changed between the current and previous input points:
         calculate a distance between the current and previous input points; and
         assign the previous input point to the first surface of the multi-Z horizon and the corresponding input point to a second surface of the multi-Z horizon when the calculated distance exceeds a picking tolerance associated with at least one of the first surface or the second surface; and
   update the current view of the seismic data within the GUI to include a visual indication of the plurality of surfaces and the at least one edge point for the multi-Z horizon.

9. The system of claim 8, wherein the seismic data displayed within the GUI is a two-dimensional (2D) representation of seismic data traces corresponding to a vertical seismic section from a seismic survey of a subsurface formation.

10. The system of claim 8, wherein the plurality of surfaces include a pair of consecutive surfaces of the multi-Z horizon.

11. The system of claim 10, wherein the at least one edge point between the plurality of surfaces is located at each intersection between the consecutive surfaces of the multi-Z horizon.

12. The system of claim 8, wherein the multi-Z horizon represents a geological structure of a subsurface formation.

13. The system of claim 12, wherein the geological structure is selected from the group consisting of: a reverse fault; a salt body; and overturned beds.

14. A non-transitory computer-readable storage medium having computer-readable instructions stored therein, which when executed by a computer cause the computer to perform a plurality of functions, including functions to:
- display seismic data within a graphical user interface (GUI) of an application executable at a computing device of a user;
- receive, via the GUI, input from the user for picking a plurality of surfaces of a multi-Z horizon being interpreted within a current view of the displayed seismic data;
- track the user's input as it is received via the GUI over a series of input points within the current view of the displayed seismic data, wherein a relative location of each of the input points is tracked within the current view as the user's input is received via the GUI;
- determine each of the plurality of surfaces picked by the user for the multi-Z horizon and at least one edge point between the picked surfaces within the current view of the seismic data, based on the tracking, wherein the functions performed by the computer to determine each surface picked by the user include functions to:
  - determine whether a direction of the user's input for picking the surfaces within the current view has changed between consecutive input points in the series, based on the tracked location of a current input point in the series relative to that of a previous input point;
  - when it is determined that the direction of the user's input has not changed between the current and previous input points, assign the current and previous input points to a first of the plurality of surfaces of the multi-Z horizon;
  - when it is determined that the direction of the user's input has changed between the current and previous input points:
    - calculate a distance between the current and previous input points; and
    - assign the previous input point to the first surface of the multi-Z horizon and the corresponding input point to a second surface of the multi-Z horizon when the calculated distance exceeds a picking tolerance associated with at least one of the first surface or the second surface; and
- update the current view of the seismic data within the GUI to include a visual indication of the plurality of surfaces and the at least one edge point for the multi-Z horizon.

15. The non-transitory computer-readable storage medium of claim 14, wherein the seismic data displayed within the GUI is a two-dimensional (2D) representation of seismic data traces corresponding to a vertical seismic section from a seismic survey of a subsurface formation.

16. The non-transitory computer-readable storage medium of claim 14, wherein the plurality of surfaces include a pair of consecutive surfaces of the multi-Z horizon.

17. The non-transitory computer-readable storage medium of claim 16, wherein the at least one edge point between the plurality of surfaces is located at each intersection between the consecutive surfaces of the multi-Z horizon.

\* \* \* \* \*